(12) United States Patent
Bury et al.

(10) Patent No.: US 9,499,649 B2
(45) Date of Patent: Nov. 22, 2016

(54) FUNCTIONALIZED PHOTOREACTIVE COMPOUNDS

(75) Inventors: Izabela Bury, Allschwil (CH); Jean-Francois Eckert, Kientzville (FR); Olivier Muller, Lautenbach (FR); Hubert Seiberle, Weil am Rhein (DE); Peggy Studer, Buschwiller (FR)

(73) Assignee: ROLIC AG, Zug (CH)

( * ) Notice: Subject to any disclaimer, the term of this patent is extended or adjusted under 35 U.S.C. 154(b) by 368 days.

(21) Appl. No.: 12/809,999

(22) PCT Filed: Nov. 6, 2008

(86) PCT No.: PCT/EP2008/009369
§ 371 (c)(1),
(2), (4) Date: Jun. 21, 2010

(87) PCT Pub. No.: WO2009/080147
PCT Pub. Date: Jul. 2, 2009

(65) Prior Publication Data
US 2010/0266821 A1    Oct. 21, 2010

(30) Foreign Application Priority Data
Dec. 21, 2007 (EP) .................................. 07123969

(51) Int. Cl.
C09K 19/56 (2006.01)
C08F 222/10 (2006.01)
G02B 5/30 (2006.01)
G02F 1/1337 (2006.01)

(52) U.S. Cl.
CPC ......... *C08F 222/1006* (2013.01); *G02B 5/305* (2013.01); *B32B 2457/202* (2013.01); *C09K 19/56* (2013.01); *G02F 1/133711* (2013.01); *G02F 1/133788* (2013.01); *Y10T 428/1005* (2015.01); *Y10T 428/24802* (2015.01)

(58) Field of Classification Search
CPC ............... C09K 19/56; C07C 321/00–321/30; C07C 323/00–323/67; B05D 3/06–3/068; G02F 1/1337–1/133788; G02F 2001/1337–2001/133796; C08F 222/1006; G02B 5/305; B32B 2457/202; Y10T 428/1005; Y10T 428/24802
USPC ............ 428/1.1, 1.2, 1.21, 1.23, 1.25, 1.26, 428/1.27, 1.28; 427/519; 252/299.01, 252/299.6; 349/98, 124
See application file for complete search history.

(56) References Cited

U.S. PATENT DOCUMENTS

| | | | |
|---|---|---|---|
| 4,435,497 A * | 3/1984 | Irving | 430/288.1 |
| 4,983,479 A | 1/1991 | Broer et al. | |
| 5,019,483 A * | 5/1991 | Lin et al. | 430/288.1 |
| 5,389,698 A | 2/1995 | Chigrinov et al. | |
| 5,567,349 A | 10/1996 | Kelly et al. | |
| 5,593,617 A | 1/1997 | Kelly et al. | |
| 5,602,661 A | 2/1997 | Schadt et al. | |
| 5,650,534 A | 7/1997 | Kelly et al. | |
| 5,744,514 A | 4/1998 | Shustack | |
| 5,756,260 A * | 5/1998 | Sashida et al. | 430/283.1 |
| 5,833,880 A | 11/1998 | Siemensmeyer et al. | |
| 5,838,407 A | 11/1998 | Chigrinov et al. | |
| 5,876,805 A * | 3/1999 | Ostlie | 427/519 |
| 5,965,761 A | 10/1999 | Buchecker et al. | |
| RE36,625 E | 3/2000 | Herr et al. | |
| 6,096,241 A * | 8/2000 | Coates et al. | 252/299.01 |
| 6,107,427 A | 8/2000 | Herr et al. | |
| 6,160,597 A | 12/2000 | Schadt et al. | |
| 6,201,087 B1 | 3/2001 | Herr et al. | |
| 6,215,539 B1 | 4/2001 | Schadt et al. | |
| 6,277,502 B1 | 8/2001 | Buchecker et al. | |
| 6,300,991 B1 | 10/2001 | Schadt et al. | |
| 6,335,409 B1 | 1/2002 | Herr et al. | |
| 6,369,869 B2 | 4/2002 | Schadt et al. | |
| 6,608,661 B1 | 8/2003 | Schadt et al. | |
| 6,610,462 B1 * | 8/2003 | Chien et al. | 430/321 |
| 6,630,076 B1 | 10/2003 | Cherkaoui et al. | |
| 6,632,909 B2 | 10/2003 | Buchecker et al. | |
| 6,649,230 B1 | 11/2003 | Seiberle et al. | |
| 6,676,851 B1 | 1/2004 | Buchecker et al. | |
| 6,717,644 B2 | 4/2004 | Schadt et al. | |
| 6,727,968 B1 * | 4/2004 | Bryan-Brown | C09K 19/0208 349/122 |
| 6,733,690 B1 | 5/2004 | Lukac et al. | |
| 6,746,729 B1 | 6/2004 | Cherkaoui et al. | |

(Continued)

FOREIGN PATENT DOCUMENTS

EP     0 331 233 A2    9/1989
EP     0 763 552 A2    3/1997

(Continued)

OTHER PUBLICATIONS

Lecamp et al., Photoinitiated cross-linking of a thiol-methacrylate system, 2001, Polymer, 42, 2727-2736.*

(Continued)

*Primary Examiner* — Gwendolyn Blackwell
*Assistant Examiner* — Eli D Strah
(74) *Attorney, Agent, or Firm* — Sughrue Mion, PLLC

(57) ABSTRACT

The present invention relates to a photoreactive compound for the preparation of a photoalignment material comprising thioether units, wherein the photoreactive compound is comprising at least one ene group and at least one photoalignment group, and further to a composition comprising at least one photoreactive compound and at least one polythiol, the use of this composition for the preparation of photoalignment materials, and their use for the alignment of liquid crystals or liquid crystal polymers, in electro-optical and optical elements, systems and devices.

18 Claims, No Drawings

(56) References Cited

U.S. PATENT DOCUMENTS

| | | | |
|---|---|---|---|
| 6,749,771 B1 | 6/2004 | Cherkaoui et al. | |
| 6,833,421 B1 | 12/2004 | Marck | |
| 6,955,757 B1 | 10/2005 | Maltin | |
| 7,364,671 B2 | 4/2008 | Schadt et al. | |
| 2003/0039768 A1 | 2/2003 | Buchecker et al. | |
| 2004/0185185 A1* | 9/2004 | Kitson et al. | 428/1.1 |
| 2004/0265742 A1* | 12/2004 | Marck et al. | 430/281.1 |
| 2005/0179003 A1* | 8/2005 | Heckmeier et al. | 252/299.01 |
| 2005/0227021 A1* | 10/2005 | Harding et al. | 428/1.1 |
| 2006/0193999 A1* | 8/2006 | Verall et al. | 428/1.1 |
| 2007/0179221 A1* | 8/2007 | Kitamura | 524/69 |
| 2007/0257230 A1 | 11/2007 | Cherkaoui et al. | |
| 2007/0270548 A1* | 11/2007 | Bojkova et al. | 525/123 |
| 2008/0036946 A1 | 2/2008 | Ono et al. | |
| 2008/0069968 A1 | 3/2008 | Cherkaoui et al. | |
| 2008/0274304 A1 | 11/2008 | Cherkaoui et al. | |
| 2008/0293888 A1 | 11/2008 | Bachels et al. | |
| 2009/0023831 A1* | 1/2009 | Miyata et al. | 522/97 |
| 2010/0048849 A1 | 2/2010 | Eckert et al. | |

FOREIGN PATENT DOCUMENTS

| | | | |
|---|---|---|---|
| EP | 1 090 325 A1 | 4/2001 | |
| EP | 1 840 604 A1 | 10/2007 | |
| EP | 1840604 A1 * | 10/2007 | G02B 5/30 |
| JP | 2006171495 A * | 6/2006 | G02F 1/1335 |
| WO | 88/02902 A2 | 4/1988 | |
| WO | 95/24454 A1 | 9/1995 | |
| WO | 00/04110 A1 | 1/2000 | |
| WO | 00/07975 A1 | 2/2000 | |
| WO | 00/48985 A1 | 8/2000 | |
| WO | 00/55110 A1 | 9/2000 | |
| WO | 00/59966 A1 | 10/2000 | |
| WO | 00/63154 A1 | 10/2000 | |
| WO | 01/07495 A1 | 2/2001 | |
| WO | 01/27040 A1 | 4/2001 | |
| WO | 01/53384 A1 | 7/2001 | |
| WO | 2005/054406 A1 | 6/2005 | |
| WO | 2006/039824 A1 | 4/2006 | |
| WO | 2007/033506 A1 | 3/2007 | |
| WO | WO 2007033506 A1 * | 3/2007 | C09K 19/56 |
| WO | WO 2007086461 A1 * | 8/2007 | C08G 75/04 |
| WO | WO 2008077261 A1 * | 7/2008 | C09K 19/38 |
| WO | 2009/080271 A1 | 7/2009 | |

OTHER PUBLICATIONS

Obara et al., JP 2006171495 A, English Machine Translation provided by http://dossier1.ipdl.inpit.go.jp/AIPN/odse_top_dn.ipdl?N0000=7400.*

A.A. Dias et al., "Maleimides and tertiary amines—Effective Type II photoinitiators for acrylate polymerisation", Surface Coatings International, 2000 (10), pp. 502-507.

Dong Hae Suh et al., "Polymethacrylates with benzylidenephthalimidine side chains, 1 Photochemical characteristics of model compounds and polymers", Macromol. Chem. Phys., 1998, pp. 363-373, vol. 199.

Dong-Hae Suh et al., "Polymethacrylates with benzylidenephthalimidine side chains, 2 Photocontrol of alignment of a nematic liquid crystal", Macromol. Chem. Phys., 1998, pp. 375-383, vol. 199.

Hubert Seiberle et al., "Multidomain LCDs and Complex Optical Retarders Generated by Photo-Alignment", Proceedings of EuropDisplay 99, Sep. 6-9, 1999.

K. Sakamoto et al., "Surface anisotropy of polyimide film irradiated with linearly polarized ultraviolet light", Applied Physics Letters, Apr. 13, 1998, pp. 1832-1834, vol. 72, No. 15.

Kunihiro Ichimura "Photoalignment of Liquid-Crystal Systems", Chem. Rev. 2000, pp. 1847-1873, vol. 100.

M. O'Neill et al., "Photoinduced surface alignment for liquid crystal displays", J. Phys. D: Appl. Phys., 2000, pp. R67-R84, vol. 33.

M. Schadt et al., "Optical patterning of multidomain LCDs", Journal of the SID, 1997, pp. 367-370.

Martin Schadt et al., "Optical patterning of multi-domain liquid-crystal displays with wide viewing angles", Nature, May 16, 1996, pp. 212-215, vol. 381.

Martin Schadt et al., "Surface-Induced Parallel Alignment of Liquid Crystals by Linearly Polymerized Photopolymers", Jpn. J. Appl. Phys., pp. 2155-2164, vol. 31, 1992.

Masaki Obi et al., "Photocontrol of Liquid Crystal Alignment by Polymethacrylates with Diphenylacetylene Side Chains", Chem. Mater., 1999, pp. 1293-1301, vol. 11.

P.L. Egerton et al., "Photocycloaddition in Solid Poly(vinyl cinnamate). The Photoreactive Polymer Matrix as an Ensemble of Chromophore Sites", Macromolecules, 1981, pp. 95-100, vol. 14, American Cancer Society.

Shigeru Yamaki et al., "Photochemistry of polymethacrylates with styrylpyridine side chains and their photocontrollability of liquid crystal alignment", Journal of Photopolymer Science and Technology, 1992, pp. 279-282, vol. 12, No. 2.

Soyoung Song et al., Photoalignment Films of Polyesters with Photoreactive Main Chain, Jpn. J. Appl. Phys., 1998, pp. 2620-2624, vol. 37.

Yuezhong Meng et al., "Crosslinking of Poly(arylene disulfide)s and Poly(arylene sulfane)s Derived from Cyclic(arylene disulfide) Oligomers", Journal of Applied Polymer Science, 1999, pp. 3069-3077, vol. 74.

Yutaka Makita et al., "Photo Alignment Materials with High Sensitivity to Near UV Light", Journal of Photopolymer Science and Technology, 1998, pp. 187-192, vol. 11, No. 2.

* cited by examiner

FUNCTIONALIZED PHOTOREACTIVE COMPOUNDS

The present invention relates to a photoreactive compound for the preparation of a photoalignment material comprising thioether units, wherein the photoreactive compound is comprising at least one ene group and at least one photoalignment group, and further to a composition comprising at least one photoreactive compound and at least one polythiol, the use of this composition for the preparation of photoalignment materials, and their use for the alignment of liquid crystals or liquid crystal polymers, in electro-optical and optical elements, systems and devices.

Liquid crystal devices are more and more used in many different applications. Examples are optical films, in particular polarizing films and retardation films, as well as security devices for preventing forgery, counterfeiting and copying and liquid crystal displays (LCD).

Liquid crystal displays (LCDs) are becoming increasingly dominant in advanced visualization devices. LCDs offer favourable characteristics with respect to image quality (high luminance, high resolution, colour and grey scale capability), power consumption as well as dimensions and weight (flat panel displays). The use of commercial LCDs has become widespread, e.g. in automotive and telecommunication instruments, as well as in monitors of notebooks, desktop computers, television sets, etc. Today the need for LCDs in television applications is rapidly growing. Recently developed LCD modes possess high potentials in achieving fast response times, wide viewing angles and high luminance. Amongst other newly developed LCD modes, the MVA (multi-domain vertical alignment) mode appears to be the most promising for the use in modern television applications. In the MVA mode the liquid crystal molecules are usually nearly vertically aligned with respect to the surface of the substrates. By using protrusions (or other alignment subdivisions) on the surface of the substrate, the liquid crystal molecules become locally pre-tilted within a single cell in more than one direction, leading to domains switchable in different directions. This multi-domain configuration exhibits very good display performance, with wide viewing angles of up to 160° in any direction, short response times (below 20 ms), high contrast ratios (up to 700:1) and high brightness. However, by means of using protrusions only, it is difficult to clearly define the domain space within a single pixel. Therefore the MVA mode demands additional manufacturing steps to ensure shape effects as well as electrical field effects on both the upper and lower substrate; hence all in all leading to complex manufacturing procedures. In order to by-pass this technical challenge, the availability of an alignment layer would be desirable, which directly leads to pre-defined alignment directions within each pixel domain and having well controllable off-axis angles with respect to the normal axis of the substrate.

The successful functioning and performance of a liquid crystal device or optical film relies on the ability of the liquid crystal molecules within that device or film to adopt an alignment imposed upon them. Alignment of the liquid crystal molecules is achieved by use of an alignment layer which defines a direction of orientation for the liquid crystal molecules with the result that the longitudinal axes of the molecules become aligned with the direction of orientation defined by the alignment layer. In addition to this directional alignment, for some applications, the alignment layer should also be able to impart to the liquid crystal molecules an angle of tilt so that the molecules align themselves at an angle out of the surface of the alignment layer.

A well known method for preparing alignment layers is a rubbing treatment wherein a high molecular resin film such as polyimide is rubbed in a single direction with a cloth. The liquid crystal molecules adjacent to the rubbed surface are aligned in the rubbing direction. However, alignment films formed by rubbing have some disadvantages like dust generation and scratches, which occur during the rubbing process. In addition, rubbing methods are not adequate for the production of structured layers, i.e layers having small areas with different alignment directions.

These problems can be solved using liquid-crystal alignment control processes other than rubbing such as oblique deposition, photolithographic, Langmuir Blodgett film, ion irradiation, high velocity fluid jet and other processes. However, most of these processes are not practical for processing large-area substrates.

Other methods developed for the alignment of liquid crystals are alignment layers made by photo-orientation methods (usually using linearly polarized light), and especially well suited are linearly photo-polymerized (LPP) alignment layers, also known as photo-oriented polymer networks (PPN). Such methods are for instance disclosed in U.S. Pat. Nos. 5,389,698, 5,838,407, 5,602,661, 6,160,597, 6,369,869, 6,717,644, 6,215,539, 6,300,991, and 6,608,661. These methods allow the generation of homogeneous alignment of liquid crystals. In the LPP process, which is a non-contact technique, alignment films similar to those obtained by rubbing can be obtained with high reproducibility by irradiating a photosensitive film on a large substrate area with polarized light. In addition, it is possible to vary the direction of orientation and the azimuthal and polar tilt angle within the photoreactive layer by controlling the direction of the irradiation of the linearly polarized light. By selectively irradiating specific regions of the photoreactive material, it is possible to align very specific regions of the layer and thus to provide alignment areas having different orientation which gives rise to structured alignment layer as described for example in Jpn. J. Appl. Phys., 31 (1992), 2155-64 (Schadt et al.). Using the linearly photo-polymerizable alignment (LPP) technique, the possibility of realizing a four-domain vertical aligned nematic (VAN) LCD was demonstrated some years ago (K. Schmitt, M. Schadt; Proceedings of EuroDisplay 99, 6-9 September, 1999). The four-domain VAN-LCD exhibits an excellent off-state angular brightness performance.

It is thus an object of the present invention to provide such photoalignment materials.

Thus, the present invention relates to a photoreactive compound comprising at least one ene group and at least one photoalignment group, for the preparation of photoalignment materials comprising thioether units, wherein "photoalignment groups", are anisotropically absorbing groups useful in the preparation of alignment layers, that induce molecular alignment by irradiation with aligning light, preferably in an adjacent liquid crystal layer or liquid crystal polymer layer, "ene" group is a residue selected from the groups of compounds given below:

norbornene, vinyl ether, vinyl ester, allyl ether, allyl ester, propenyl ether, allyl triazine, allyl isocyanurate, alkene, acrylate, unsaturated ester, imide, maleimide, methacrylate, acrylonitrile, styrene, diene and vinyl amide; preferred are alkene, vinyl ether, vinyl ester, allyl ether, allyl ester, acrylate and methacrylate, and especially most preferred are acrylate and/or methacrylate and/or vinyl ether and/or ester;

"yne" group is $C_1$-$C_6$alkyne; preferred is $C_1$-$C_4$alkyne;

with the proviso that if the photoreactive compound does not contain yne groups, then the photoreactive compound (I) contains at least two ene groups.

In the context of the present invention the term "photoalignment material" denotes a polymer, preferably in cross-linked form such as a network, and further denotes a polymer film, polymer-, orientation-, photoalignment- or alignment layer that have the function of an alignment layer as described above, prepared by means of radiation curing with aligning light.

In the context of the invention polymer denotes homo- or hetero- polymer, copolymer or prepolymer.

In the context of the invention, the term liquid crystal denotes liquid crystal or liquid crystal polymer or liquid crystal prepolymer.

Preferred photoreactive compounds are monomer(s), oligomer(s), dendrimer(s), polymers, copolymers or prepolymer(s) comprising (a) photoreactive group(s).

Preferred photoreactive compounds have a molecular weight of less than about 10000 g/mol, more preferably, less than about 5000 g/mol, more preferably, less than about 2000 g/mol.

In the context of the present invention:
the terms "polymer" and "copolymer", refer to a monomer with a higher molecular weight, typically higher than 5000 g/mol;
the terms "oligomer" and "prepolymer" refer to a monomer with a higher molecular weight, typically lower than 5000 g/mol;
the term "dendrimer" refers to a molecule comprising perfectly branched repeat units in layers emanating radially from a point-like core.

Preferred photoalignment groups are able to dimerize and/or to undergo trans-cis isomerization or which are able to photo-degradate, preferably they are able to undergo trans-cis isomerization and/or dimerize and more preferably they are able to dimerize.

In the context of the present invention the wording "photo-degradate" is attributed to the anisotropic depolymerization of a polymer, preferably polyimide.

These photoreactions are for example described in J. Phys. D: Appl. Phys., 33, R67-R84 (2000).

More preferred photoalignment groups include substituted or unsubstituted and preferably alpha, beta-unsaturated-carbonyl groups, especially those photoalignment groups of formula II; III and IV respectively

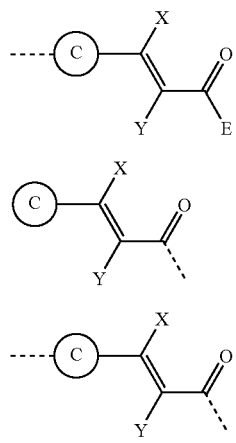

wherein
the broken line indicates the linkage in the photoreactive compound respectively;

C represents an aromatic group which is unsubstituted or substituted by fluorine, chlorine or cyano, or by a cyclic, straight-chain or branched alkyl residue which is unsubstituted, mono-substituted by cyano or halogeno, or poly-substituted by halogeno, having 1 to 18 carbon atoms and wherein one or more non adjacent $CH_2$ groups may independently be replaced by Q, wherein Q has the below given meaning;

E represents $—OR^4$, $—NR^5R^6$, or an oxygen atom linked to ring C in the ortho- position to form a coumarin unit wherein $R^4$, $R^5$ and $R^6$ are a hydrogen atom or a cyclic, straight-chain or branched alkyl residue which is unsubstituted, mono-substituted by halogeno, or poly—substituted by halogeno, having 1 to 18 carbon atoms and wherein one or more $CH_2$ groups may independently be replaced by —O—, —CO—, —CO—O—, —O—CO—, —CH=CH—, with the proviso that oxygen atoms are not directly attached to each other, or $R^5$ and $R^6$ are linked together to form an alicyclic ring with 5 to 8 atoms; and X, Y each independently of the other represents hydrogen, fluorine, chlorine, cyano, alkyl optionally substituted by fluorine having from 1 to 12 carbon atoms in which optionally one or more non-adjacent $CH_2$ groups are replaced by —O—, —CO—O—, —O—CO—and/or —CH=CH—; and more especially preferred are cinnamate groups and its derivatives, especially those of formulae:

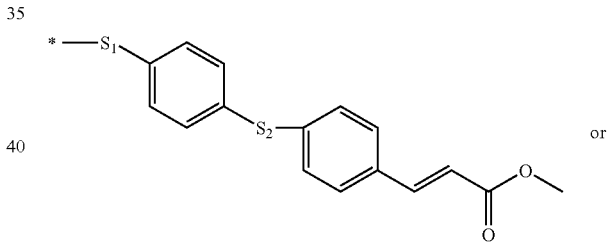

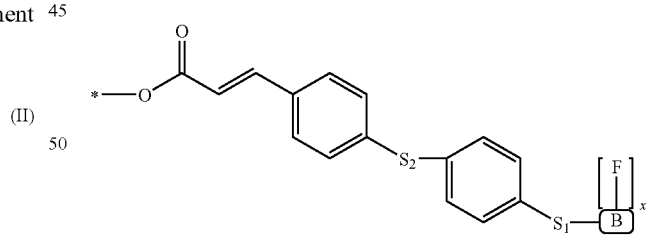

and more especially those of formulae:

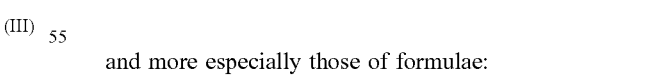

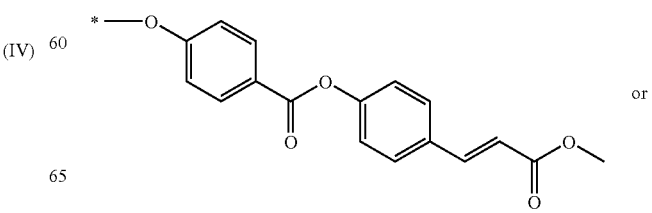

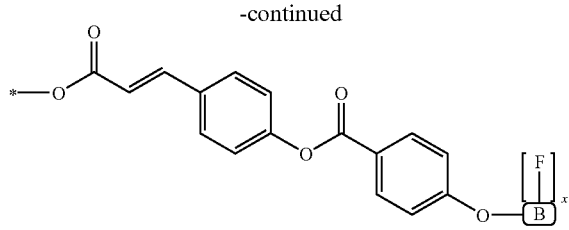

whereby the aromatic rings are unsubstituted or substituted and
wherein the compound residue (Ia)

 (Ia)

represents a straight-chain or branched $C_1$-$C_{16}$fluoralkyl group, wherein
F is fluorine, and
x is an integer from 0 to 15, preferably an integer from 0 to 10; more preferably 0, 1, 2, 3, 4, 5, 6, 7, 8 or 9 and most preferred 0 or 3, 4, 5 or 7;

B represents a straight-chain or branched $C_1$-$C_{16}$alkyl group, which is in addition to its fluorine substituent(s) unsubstituted or substituted by di-($C_1$-$C_{16}$alkyl)amino, $C_1$-$C_6$alkoxy, nitro, cyano and/or chlorine; and wherein one or more —CH$_2$— group may independently from each other be replaced by a linking group;

$S_1$ and $S_2$ independently from each other denote a spacer unit.

The term "spacer unit" as used in the context of the present invention, is preferably a single bond, a cyclic, straight-chain or branched, substituted or unsubstituted $C_1$-$C_{24}$alkylen, wherein one or more, preferably non-adjacent, —CH$_2$— groups may independently from each other be replaced by a linking group, wherein linking group, as used in the context of the present invention is preferably be selected from —O—, —CO, —CO—O—, —O—CO—,

—NR$^1$—, —NR$^1$—CO—, —CO—NR$^1$—, —NR$^1$—CO—O—, —O—CO—NR$^1$—, —NR$^1$—CO—NR$^1$—, —CH═CH—, —C≡C—, —O—CO—O—, and —Si(CH$_3$)$_2$—O—Si(CH$_3$)$_2$—, and wherein:
R$^1$ represents a hydrogen atom or $C_1$-$C_6$alkyl;

and/or a non-aromatic, aromatic, unsubstituted or substituted carbocyclic or heterocyclic group connected via bridging groups (II), and is more preferably the linking group is selected from —O—, —CO—, —CO—O—, —O—CO—;
wherein
bridging group (II) as used in the context of the present invention is preferably selected from —CH(OH)—, —CO—, —CH$_2$(CO)—, —SO—, —CH$_2$(SO)—, —SO$_2$—, —CH$_2$(SO$_2$)—, —COO—, —OCO—, —COCF$_2$—, —CF$_2$CO—, —S—CO—, —CO—S—, —SOO—, —OSO—, —SOS—, —O—CO—O—, —CH$_2$—CH$_2$—, —OCH$_2$—, —CH$_2$O—, —CH═CH—, —C≡C—, —CH═CH—COO—, —OCO—CH═CH—, —CH═N—, —C(CH$_3$)═N—, —N═N— or a single bond; or a cyclic, straight-chain or branched, substituted or unsubstituted $C_1$-$C_{24}$alkylen, wherein one or more —CH$_2$— groups may independently from each other be replaced by a linking group as described above,
with the proviso that oxygen atoms of linking groups are not directly linked to each other.

More preferably $S_1$ and $S_2$ are independently from each other —CO—O—, —O—CO— or —O—, and most preferably $S_1$ is —O— and $S_2$ is —CO—O— or —O—CO—.

Preferably B is a straight-chain or branched $C_1$-$C_{12}$alkyl, wherein one or more, preferably non-adjacent, —CH$_2$— group(s) may independently from each other be replaced by a group selected from —O—, —CO, —CO—O—, —O—CO—, —NR$^1$—, —NR$^1$—CO—, —CO—NR$^1$—, —NR$^1$—CO—O—, —O—CO—NR$^1$, —NR$^1$—CO—NR$^1$, —CH═CH—, —C≡C—, —O—CO—O—, and —Si(CH$_3$)$_2$—O—Si(CH$_3$)$_2$—, an aromatic and an alicyclic group; and wherein:
represents a hydrogen atom or $C_1$-$C_6$alkyl;
with the proviso that oxygen atoms are not directly linked to each other.

More preferably, B is a straight-chain or branched $C_1$-$C_{12}$alkyl, wherein one or more, preferably non-adjacent, —CH$_2$— group(s) may be replaced by a group selected from from —O—, —CO, —CO—O—, —O—CO—, —NR$^1$—, —NR$^1$—CO—, —CO—NR$^1$— or —CH═CH— wherein:
represents a hydrogen atom or $C_1$-$C_6$alkyl;
with the proviso that oxygen atoms are not directly linked to each other.

Most preferably, B is a straight-chain or branched $C_1$-$C_8$alkyl, wherein one or more, preferably non-adjacent, —CH$_2$— group(s) may be replaced by a group selected from —O—, —CO, —CO—O—, —O—CO—, —NR$^1$—, —NR$^1$—CO—, —CO—NR$^1$— or —CH═CH— wherein:
R$^1$ represents a hydrogen atom or $C_1$-$C_6$alkyl;
with the proviso that oxygen atoms are not directly linked to each other.

Especially most preferably, B is a straight-chain or branched $C_1$-$C_8$alkyl, wherein one or more, preferably non-adjacent, the —CH$_2$— group may be replaced by a group selected from —O—, —CO—, —CO—O—, —O—CO—, and —CH═CH—, with the proviso that oxygen atoms are not directly linked to each other.

and further more preferred photoalignment groups are, radicals of coumarine, quinolone, cyanostilbene,
especially such as cyanostilbene of formulae:

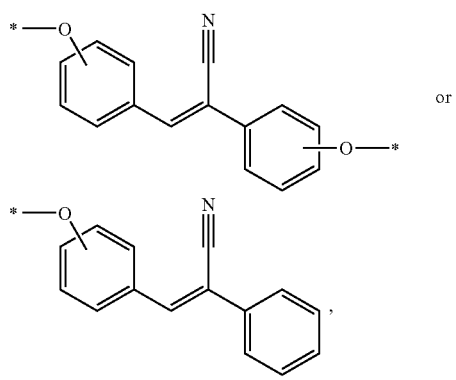

whereby the aromatic rings are unsubstituted or substituted; and
further more preferred photoalignment groups are, radicals of chalcone, diphenylacetylene, benzylidenephtalimidine, benzylideneacetophenone, phenylenediacryloyl, stilbazole, azo, polyimides and their derivatives; especially cinnamate; coumarin, anthraquinone, mericyanine, methane, 2-phenylazothiazole, 2-phenylazobenzthiazole, quinolone, diarylketones, such as benzophenone such as 4,4'-diaminobenzophenone, 4,4'-bis(trifluoromethyl)benzophenone, 3,4'-bis/trifluoromethyl)benzophenone, 3,3'-bis(trifluoromethyl)benzophenone; benzophenone imine; the phenylhydrazones of benzophenone, 4'-bis(trifluoromethyl)benzophenone, 3,4'-bis/trifluoromethyl)benzophenone or 3,3'-bis(trifluoromethyl)benzophenone; 2,4-diaminiophenylhydrazones of benzophenone, 4'-bis(trifluoromethyl)benzophenone, 3,4'-bis/trifluoromethyl)benzophenone or 3,3'-bis(trifluoromethyl)benzophenone; phenylhydrazones, semicarbazones; benzylidenephtalimidine, benzylideneacetophenone, phenylenediacryloyl, diphenylacetylene, stilbene, 1,4-bis(2-phenylethylenyl)benzene, 4,4'-bis(arylazo)stilbenes, perylene, 4,8-diamnion-1,5-naphthoquinone, cyanostilbene, diphenylacetylene, chalcone, stilbazole, organic azos, such as arylazo, di(arylazo), tri(arylazo), tetra(arylazo), penta(arylazo), reversible azo-containing polymers; or polyimide.

Preferred substituents of the photoalignment groups are substituted or unsubstituted $C_1$-$C_{24}$alkyl, preferably $C_1$-$C_{10}$alkyl residue, more preferably $C_1$-$C_8$alkyl residue, which is unsubstituted, mono-substituted by cyano or halogeno, or poly-substituted by halogeno, wherein one or more non adjacent $CH_2$ groups may independently be replaced by a group Q, wherein Q represents —O—, —CO—, —CO—O—, —O—CO—, —Si(CH$_3$)$_2$—O—Si(CH$_3$)$_2$—, —NR$^2$—, —NR$^2$—CO—, —CO—NR$^2$—, —NR$^2$—CO—O—, —O—CO—NR$^2$—, —NR$^2$—CO—NR$^2$—, —CH═CH—, —C≡C—, —O—CO—O—, preferably Q represents —O—, —CO—, —CO—O—; and wherein R$^2$ represents hydrogen or $C_1$-$C_8$alkyl;

with the proviso that oxygen atoms of linking groups are not directly linked to each other.

In addition further more preferred photoalignment groups are residues, which are herewith incorporated by reference are:

alpha, beta-unsaturated-carbonyl, such as cinnamic acid derivatives (see e.g. U.S. Pat. No. 6,610,462,B1, U.S. Pat. No. Re 36,625, EP 0 763 552 B1(GB), U.S. Pat. No. 5,965,761, U.S. Pat. No. 6,277,502 B1, U.S. Pat. No. 6,632,909 B2, WO 00/59966, WO 01/07495, WO 01/53384 A1, WO 2006/039824 A1, Macromolecules, 14, 95 (1981))

Coumarine and Quinolone derivatives (e.g. U.S. Pat. No. 6,201,087 B1, J. SID, 5/4, 367 (1997), Nature, 351, 212 (1996))

Cyanostilbene derivatives (WO07/033506)

Chalcone derivatives (J. Photopolym. Sci. Technol., 11, 187 (1998))

Diphenylacetylene derivatives (Chem. Mat., 11, 1293 (1999))

Benzylidenephtalimidine derivatives (Macromol. Chem. Phys., 199, 375 (1998))

Benzylideneacetophenone derivatives (Macromol. Chem. Phys., 199, 363 (1998))

Phenylenediacryloyl derivatives (Japan. J. Appl. Phys., 1, 37, 2620 (1998))

Stilbazole derivatives (J. Photopolym. Sci. Technol., 12, 279 (1999))

Azo derivatives (Chemical Reviews, 100, 1847 (2000))

Polyimides, which photo-degrade by use of linear polarized UV light as for example described in Appl. Phys. Lett., 72, 1832-1833 (1998).

Preferably, the present invention relates to a photoreactive compound (I) for the preparation of photoalignment materials comprising thioether units, comprising at least one ene group and at least one organic photoalignment group of formula

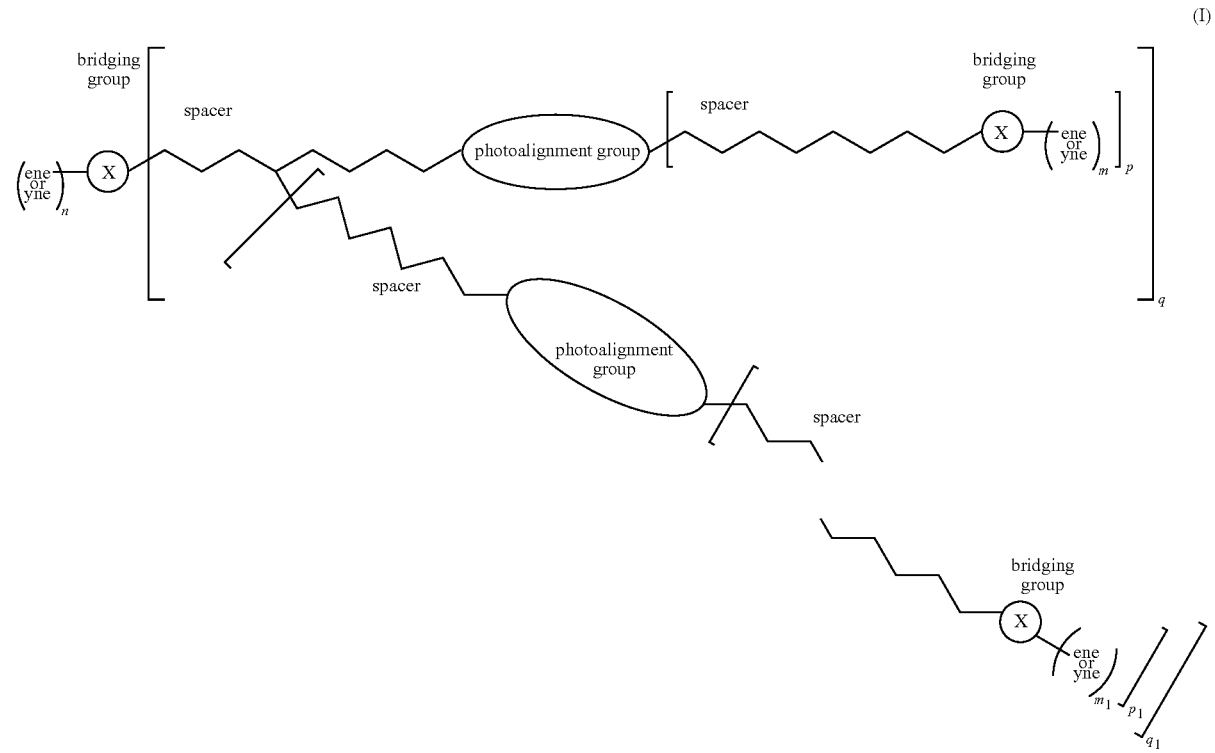

(I)

wherein

"photoalignment groups", "ene", "yne" have independently from each other the same meanings and preferences as described above, "spacer" independently from each other represents a simple covalent bound or a straight-chain or branched $C_1$-$C_{24}$alkyl residue, preferably $C_1$-$C_{10}$alkyl residue, more preferably $C_1$-$C_8$ alkyl residue, which is unsubstituted, mono-substituted by cyano or halogeno, or poly-substituted by halogeno, wherein one or more non adjacent $CH_2$ groups may independently be replaced by a group Q, wherein Q represents —O—, —CO—, —CO—O—, —O—CO—, —Si($CH_3$)$_2$—O—Si($CH_3$)$_2$—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, —O—CO—O—, aromatic group, preferably Q represents —O—, —CO—, —CO—O—; or an unsubstituted or substituted aromatic group, preferably the aromatic group is unsubstituted or substituted phenylen and wherein $R^2$ represents hydrogen or $C_1$-$C_6$alkyl; preferably spacer is a simple covalent bond or a $C_1$-$C_2$alkyl residue; with the proviso that oxygen atoms of linking groups are not directly linked to each other;

"bridging group" represents independently from each other an unsubstituted or substituted, uninterrupted or interrupted with Q within the meaning and preferences as given above;

aliphatic, aromatic and/or alicyclic hydrocarbon group having from 1 to 40 carbon atoms, preferred are 1 to 24 and more preferred are 1 to 14 carbon atoms. Examples of bridging groups are the below given one, however bridging groups are not limited to them;

a single covalent bound, or a group of formula:

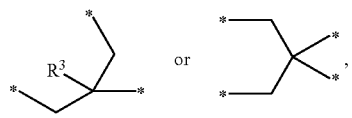

wherein $R^3$ is substituted or unsubstituted $C_1$-$C_6$alkyl, preferably ethyl or methyl, m and m1 are independently from each other 0, 1, 2 or 3, preferably 1 or 2, n is 1, 2 or 3, preferably 1 or 2, q is 1, 2 or 3, preferably 1 or 2, q1 is 0, 1, 2 or 3, preferably 0 or 1, p and p1 are independently from each other 0, 1, 2, 3, preferably 0 or 1

"*" represents a covalent linkage to the residue of the compound, with the proviso that if the photoreactive compound (I) does not contain yne groups, then the photoreactive compound (I) contains at least two ene groups.

Examples of photoreactive compounds are for example but not limited to:

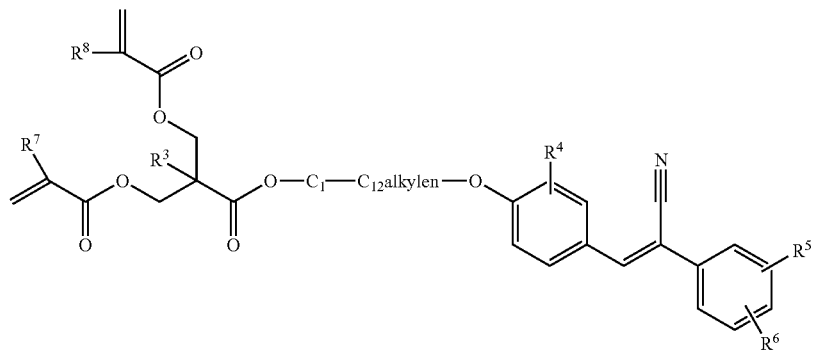

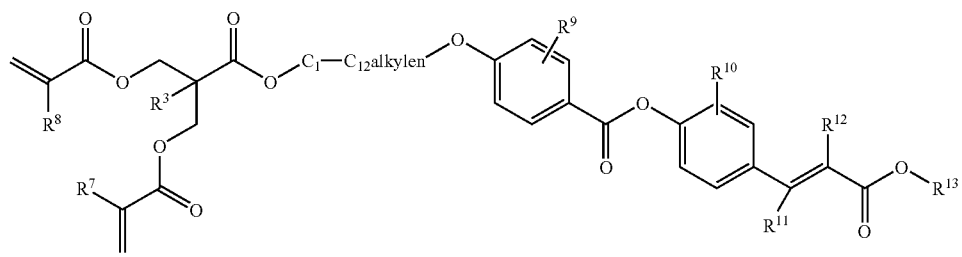

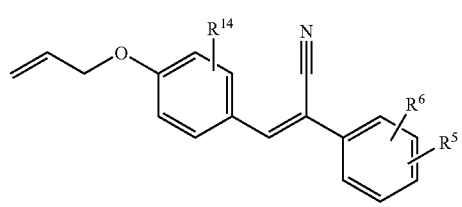

-continued

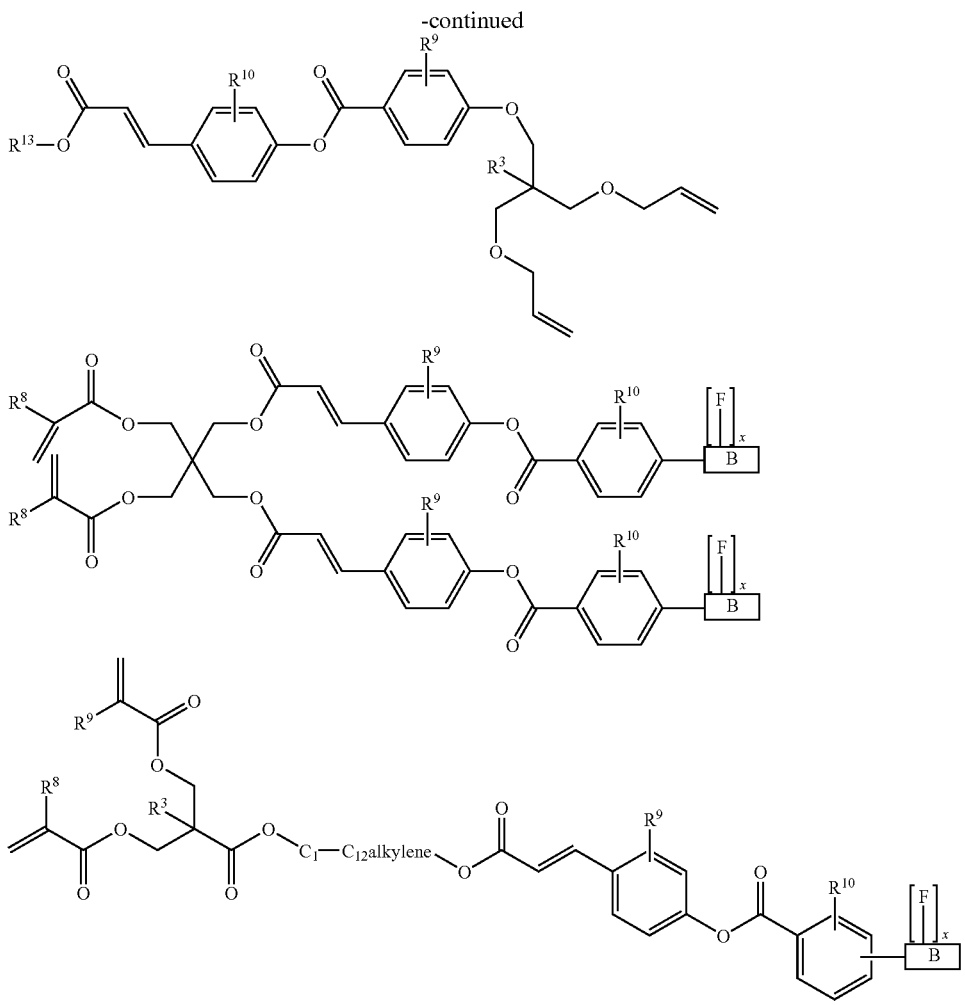

wherein $R^3$, $R^4$, $R^5$, $R^6$, $R^7$, $R^8$, $R^9$, $R^{10}$, $R^{11}$, $R^{12}$, $R^{13}$, $R^{14}$ are independently from each other hydrogen or substituted or unsubstituted $C_1$-$C_6$alkyl, preferably ethyl or methyl, $C_1$-$C_6$alkoxy, preferably ethoxy or methoxy, halogen, cyano, preferably $R^3$ is hydrogen or substituted or unsubstituted $C_1$-$C_6$alkyl, preferably ethyl or methyl, $R^4$, $R^5$, $R^6$, $R^9$, $R^{10}$, $R^{14}$ are independently from each other hydrogen or substituted or unsubstituted $C_1$-$C_6$alkoxy, preferably ethoxy or methoxy, $R^8$, $R^9$ independently from each other are hydrogen or substituted or unsubstituted $C_1$-$C_6$alkyl, preferably methyl, B and x have the same meaning and preferences as given above, especially preferred is —O—$C_3H_6C_2F_5$ or —O—$C_3H_6CF_3$.

More preferred are photoreactive compounds (I) containing at least two ene groups.

Most preferred are photoreactive compounds (I) containing at least two ene groups selected from the acrylate, methacrylate, allyl, vinyl ether group.

Especially most preferred are photoreactive compounds (I) containing two ene groups selected from the acrylate, methacrylate, allyl, vinyl ether group.

In the context of the present invention the term alkyl, unless the context requires otherwise, includes straight-chain and branched, saturated and unsaturated, substituted or unsubstituted hydrocarbons chains, which are interrupted by Q as described above within the given limitations, or uninterrupted. The description and preferences of the term alkyl are used in the context of the present invention in analogy to derivatives of alkyl, such as alkynyl, alkylene, alkoxy or di-($C_1$-$C_{16}$alkyl)amino etc.

An aliphatic hydrocarbon group is preferably an alkylene.

Alkyl is $C_1$-$C_{40}$alkyl, especially $C_1$-$C_{24}$alkyl, preferred $C_1$-$C_{16}$alkyl group, more preferred $C_1$-$C_{12}$alkyl, most preferred $C_1$-$C_{10}$alkyl, very most preferred $C_1$-$C_8$alkyl, especially very most preferred $C_1$-$C_6$alkyl, more especially very most preferred $C_1$-$C_2$alkyl.

$C_1$-$C_{24}$alkyl is for example methyl, ethyl, propyl, isopropyl, butyl, sec.-butyl, tert.-butyl, pentyl, hexyl, heptyl, octyl, nonyl, decyl, undecyl, dodecyl, tridecyl, tetradecyl, pentadecyl, hexadecyl, heptadecyl, octadecyl, nondecyl, eicosyl.

An alicyclic group is preferably a non-aromatic group or unit. Preferably an alicyclic group is a non-aromatic carbocyclic or heterocyclic group and represents for example ring systems, with 3 to 30 carbon atoms, as for example cyclopropane, cyclobutane, cyclopentane, cyclopentene, cyclohexane, cyclohexene, cyclohexadiene, decaline, tetrahydrofuran, dioxane, pyrrolidine, piperidine or a steroidal skeleton such as cholesterol.

The term "aromatic", as used in the context of the present invention, preferably denotes unsubstituted or substituted carbocyclic and heterocyclic groups, incorporating five, six, ten of 14 ring atoms, e.g. furan, benzene or phenylene, pyridine, pyrimidine, naphthalenen, which may form ring assemblies, such as biphenylene or triphenylen, which are uninterrupted or interrupted by at least a single heteroatom and/or at least a single bridging group; or fused polycyclic systems, such as phenanthrene, tetraline. Preferably aromatic group are benzene, phenylene, biphenylene or triphenylen. More preferred aromatic group are benzene, phenylene and biphenylene.

A carbocyclic or heterocyclic aromatic group incorporates preferably five, six, ten or 14 ring atoms, as for example furan, benzene, pyridine, triazine, pyrimidine, naphthalene, phenanthrene, biphenylene or tetraline units, preferably naphthalene, phenanthrene, biphenylene or phenylene, more preferably naphthalene, biphenylene or phenylene, and most preferably phenylene.

The carbocyclic or heterocyclic aromatic group is for example unsubstituted or mono- or poly-substituted. Preferred substitutents of carbocyclic or heterocyclic aromatic groups are at least one halogen, hydroxyl, a polar group, acryloyloxy, alkylacryloyloxy, alkoxy, alkylcarbonyloxy, alkyloxycarbonyloxy, alkyloxocarbonyloxy, methacryloyloxy, vinyl, vinyloxy and/or allyloxy group, wherein the alkyl residue has preferably from 1 to 20 carbon atoms, and more preferably having from 1 to 10 carbon atoms. Preferred polar groups are nitro, cyano or a carboxy group, and/or a cyclic, straight-chain or branched $C_1$-$C_{30}$alkyl, which is unsubstituted, mono- or poly-substituted. Preferred substitutents of $C_1$-$C_{30}$alkyl are methyl, fluorine and/or chlorine, wherein one or more, preferably non-adjacent, —$CH_2$— group may independently of each other be replaced by a linking group. Preferably, the linking group is selected from —O—, —CO—, —COO— and/or —OCO—.

A monocyclic ring of five or six atoms is for example furan, benzene, preferably phenylene, pyridine, pyrimidine.

A bicyclic ring system of eight, nine or ten atoms is for example naphthalene, biphenylene or tetraline.

A tricyclic ring system of thirteen or fourteen atoms is for example phenanthrene.

The term "phenylene", as used in the context of the present invention, preferably denotes a 1,2-, 1,3- or 1,4-phenylene group, which is optionally substituted. It is preferred that the phenylene group is either a 1,3- or a 1,4-phenylene group. 1,4-phenylene groups are especially preferred.

The term "halogen" or "halogeno" denotes a chloro, fluoro, bromo or iodo substituent, preferably a chloro or fluoro substituent.

The term "polar group", as used in the context of the present invention primarily denotes a group like a nitro, cyano, or a carboxy group.

The term "heteroatom", as used in the context of the present invention primarily denotes oxygen, sulphur and nitrogen, preferably oxygen and nitrogen, in the latter case preferably in the form of —NH—.

The term "substituted" as used in the context of the present invention primarily means substituted by $C_1$-$C_6$alkyl, $C_1$-$C_6$alkoxy, hydroxy, halogen or by a polar group as defined above.

In addition, the present invention relates to a composition (VI) for the preparation of photoalignment materials comprising thioether units, comprising:
a) at least one photoreactive compound for the preparation of photoalignment materials comprising thioether units; comprising at least one ene group and at least one photoalignment group within the above given meanings and preferences, and
b) at least one polythiol of formula (V)

$$X\text{(SH)}_{nt}  \quad\quad\quad\text{(V)}$$

wherein
X is an organic residue and
nt is a positive integer, preferably ≥2 preferably an integer from 2 to 10, more preferably 3 or 4, c) optionally at least one reactive and/or non-reactive additive(s), and
d) optionally at least one initiator(s), and
e) optionally at least one solvent(s).

For the polythiols of formula (V), the term "organic residue" used for X relates to the organic residues of polythiols, within the meaning and preferences as given below.

In the context of the present invention suitable polythiols may be any of those known in the art. As polythiol any compound can be used which comprises molecules having two or more thiol groups per molecule. The polythiol has a molecular weight in the range from about 50 to about 20,000 g/mol.

Preferably polythiols are monomeric, aliphatic or aromatic polythiols, oligomeric and polymeric polythiols.

Preferred polythiols are di-, tri-, tetra- or multifunctional thiols.

Preferred polymeric polythiol is for example polypropylene ether glycol bis(beta-mercaptopropionate) which is prepared from polypropylene-ether glycol (e.g. Pluracol P201, Wyandotte Chemical Corp.) and beta-mercaptopropionic acid by esterification. Poly-alpha-mercaptoacetate or poly-beta-mercaptopropionate esters, particularly the trimethylolpropane triesters or pentaerythritol tetra esters are preferred.

Preferred alkyl thiol functional compounds are for example 1,2-dimercaptoethane, 1,6-dimercaptohexane, decamethylene dithiol, and the like. Thiol terminated polysulfide resins may also be employed.

Preferred aliphatic dithiols include 1,2-ethanedithiol, butanedithiol, 1,3-propanedithiol, 1,5-pentanedithiol, 2,3-dimercapto-1-propanol, dithioerythritol, 3,6-dioxa-1,8-octanedithiol, 1,8-octanedithiol hexanedithiol, dithiodiglycol, pentanedithiol, decanedithiol, 2-methyl 1,4 butanedithiol, bis-mercaptoethylphenyl methane, 1,9-nonanedithiol(1,9-dimercaptononane), glycol dimercaptoacetate.

Preferred aromatic dithiols include 1,2-benzenedithiol, 1,3-benzenedithiol, 1,4-benzenedithiol, 2,4,6-trimethyl-1,3-benzenedimethanethiol, durene-alpha 1, alpha 2-dithiol, 3,4-dimercaptotoluene, 4-methyl-1,2-benzenedithiol, 2,5-dimercapto-1,3,4-thiadiazole, 4,4'-thiobisbezenedithiol, bis(4-mercaptophenyl)-2,2'-propane(bisphenol dithiol) (made according to the method of Meng Y. Z., Hay. A. S., J. of App. Polym. Sci., V74, 3069-3077(1999).

Preferred oligomeric dithiols include difunctional mercapto functional urethane oligomers derived from end capping moieties of hydroxyethyl mercaptan, hydroxypropyl mercaptan, dimercaptopropane, dimercapto ethane as described in patent by Shustack U.S. Pat. No. 5,744,514.

Preferred trithiol functional compounds include, trimethylolethane tris-mercaptopropionate, trimethylolpropane tris-mercaptopropionate (TMPTSH), trimethylolethane tris-mercaptoacetate, and trimethylolpropane tris-mercaptoaacetate glycerol tri(11-mercaptoundecanoate), trimethylol propane tri(11-mercaptoundecate).

Preferred tetrafunctional thiols include pentaerythritol tetramercapto propionate, pentaerythritol tetramercapto acetate, and pentaerythritotetra(11-mercaptoundecate)

Preferred are multifunctional thiols having functionality greater than 4, include polythiols as described on page 7 of WO/88 02902.

Multi functional thiols can be obtained by reacting thioalkyl carboxylic acids as for example thioglycolic acid, mercapto propionic acid with high functional alcohols, amines and thiols. Furthermore, multifunctional thiols can be obtained by reacting mercapto alkyl trialkoxy silanes with silanols that may be polymeric or silica based silanols.

Other preferred multifunctional thiols are obtained using thiol carboxylic acids (HS—R—COOH) where R=alkyl, or aryl groups eg thioundecanoic acid of which the COOH groups are reacted with reactive enes, alcohols, thiols or amines that are multifunctional.

Especially preferably, $X^a$ is a polyvalent aliphatic, organic residue of an organic ester of —$C_1$-$C_{10}$alkylen-COOH with polyhydroxy compounds, such as for example glycols, triols, tetraols, pentaols or hexaols.

More preferred, an organic residue is an ester of glycolic acid (—$CH_2COOH$), alpha-propionic acid (—$CH(CH_3)$—COOH and beta-propionic acid (—$CH_2CH_2COOH$) with polyhydroxy compounds such as for example glycols, triols, tetraols, pentaols or hexaols.

Preferred are organic residues of an organic ester of —$C_1$-$C_{10}$alkylen-COOH, preferably —$C_1$-$C_4$alkylen-COOH, most preferably —$C_2$-$C_3$alkylen-COOH with polyhydroxy compounds, such as for example glycols, triols, tetraols, pentaols or hexaols.

More preferred are organic residues of an ester of —$CH_2COOH$, —$CH(CH_3)$—COOH, —$CH_2CH_2COOH$ with polyhydroxy compounds such as for example glycols, triols, tetraols, pentaols or hexaols.

Especially most preferred are organic residue from polythiols such as glycolate and propionate esters such as ethylene glycol bis(thioglycolate), ethylene glycol bis (beta-mercaptopropionate), trimethylolpropane tris(thioglycolate), trimethylolpropane tris (beta-mercaptopropionate), pentaerythritol tetrakis (beta-mercaptopropionate), glycol dimercaptoacetate, 1,2,6-hexanetriol trithioglycolate, trimethylolethane trithioglycolate, pentaerythritol tetra(mercaptoacetate), trimethylolpropane trithioglycolate and glyceryl thioglycolate; and propionate esters such as trimethylolethane tri-(3-mercapto propanate), pentaerythritol tetrakis(3-mercaptopropionate), trimethylolpropane tri(3-mercapto propionate) or glycol dimercaptopropionate, all of which are commercially available, or are accessible by methods known in the art.

For the polythiols of formula (V), particularly preferred are polythiols of the formula comprising subunits(Va)

OCO(CH$_2$)$_m$SH                    (Va)

wherein m represent preferably 1 to 4; more preferably, 1 and 2; most preferably 2.

In the context of the present invention the organic residue X denotes preferably a polyvalent organic residue of an organic ester of —$C_1$-$C_{10}$alkylen-COOH with polyhydroxy compounds, such as for example glycols, triols, tetraols, pentaols or hexaols.

More preferred, X is an ester of glycolic acid (—$CH_2COOH$), alpha-propionic acid (—$CH(CH_3)$—COOH and beta-propionic acid (—$CH_2CH_2COOH$) with polyhydroxy compounds such as for example glycols, triols, tetraols, pentaols or hexaols.

Preferred are polythiols of an organic ester of HS—$C_1$-$C_{10}$alkylen-COON, preferably HS—$C_1$-$C_4$alkylen-COOH, most preferably HS—$C_2$-$C_3$alkylen-COOH with polyhydroxy compounds, such as for example glycols, triols, tetraols, pentaols or hexaols.

More preferred are polythiols of an ester of thioglycolic acid (HS—$CH_2COOH$), alpha-mercaptopropionic acid (HS—$CH(CH_3)$—COOH and beta -mercaptopropionic acid (HS—$CH_2CH_2COOH$) with polyhydroxy compounds such as for example glycols, triols, tetraols, pentaols or hexaols.

Especially most preferred polythiols are glycolate and propionate esters such as ethylene glycol bis(thioglycolate), ethylene glycol bis (beta-mercaptopropionate), trimethylolpropane tris(thioglycolate), trimethylolpropane tris (beta-mercaptopropionate), pentaerythritol tetrakis (beta-mercaptopropionate), glycol dimercaptoacetate, 1,2,6-hexanetriol trithioglycolate, trimethylolethane trithioglycolate, pentaerythritol tetra(mercaptoacetate), trimethylolpropane trithioglycolate and glycetryl thioglycolate; and propionate esters such as trimethylolethane tri-(3-mercapto propanate), pentaerythritol tetrakis(3-mercaptopropionate), trimethylolpropane tri(3-mercapto propionate) or glycol dimercaptopropionate, all of which are commercially available, or are accessible by methods known in the art.

Whether an initiator is used in the composition of the invention and the type of the initiator depend on the envisaged use of the composition, and the kind of starting materials and process parameters. In general, it is preferred to use an initiator. Any type of initiators may be selected. Different kinds of photoinitiators exist: radical polymerization initiators, cationic polymerization initiators, anionic polymerization initiators, coordination catalytic polymerization initiators. Preferred are radical initiators that are substances that can produce radical species under mild conditions e.g. upon heating and/or by irradiation and promote radical polymerization reactions. More preferred are thermal and photo-initiators or a combination thereof. More preferred are radical photo-initiators.

Conventionally, the photo-initiators absorb at the wavelength of the actinic radiation. When polymerization is carried out by means of UV light, a photo-initiator can be used that decomposes under UV irradiation to produce free radicals or ions that initiate the polymerization reaction. UV photo-initiators are preferred, in particular radical UV photoinitiators. Examples of free radical photo-initiators or maleimide photo-initiators are described by Dias et. al. (Surface Coatings International, JOCCA 2000, 10, 502-506 and WO-01/27040).

As standard photoinitiator for radical polymerization for example the commercially available: Irgacure® 907, Irgacure® 651, Irgacure® 369, Irgacure® 184, Darocure® 1173 or Darocure® 4205 (all from Ciba Specialty Chemicals) can be used.

Ideally, a thermal free radical initiator should be relatively stable at room temperature but should decompose rapidly enough at the polymer-processing temperature to ensure a practical reaction rate. Typical examples of thermal initiators are halogen molecules, azo compounds, and organic peroxides. Preferred thermal initiators include peresters, peroxycarbonates, peroxides, azonitrile compounds, and the like; such as for examples tert-Amyl peroxybenzoate; 4-Azobis (4-cyanovaleric acid); 1,1'-Azobis(cyclohexanecarbonitrile); 2,2'-Azobisisobutyronitrile (AIBN); Benzoyl peroxide; 2,2-Bis(tert-butylperoxy)butane; 1,1-Bis(tert-butylperoxy)cyclohexane; 2,5-Bis(tert-butylperoxy)-2,5-dimethylhexane; 2,5-Bis(tert-Butylperoxy)-2,5-dimethyl-3-hexyne; Bis(1-(tert-butylperoxy)-1-methylethyl)benzene; 1,1-Bis(tert-butylperoxy)-3,3,5-trimethylcyclohexane; tert-Butyl hydroperoxide; tert-Butyl peracetate; tert-Butyl peroxide; tert-Butyl peroxybenzoate; tert-Butylperoxy isopropyl carbonate; Cumene hydroperoxide; Cyclohexanone peroxide; Dicumyl peroxide; Lauroyl peroxide; 2,4-Pentanedione peroxide; Peracetic acid; Potassium persulfate. Ideally, a thermal free radical initiator should be relatively stable at room temperature but should decompose rapidly enough at the polymer-processing temperature to ensure a practical reaction rate.

Promoters or accelerators such as metal salts and amines may be used with the initiators.

Reactive additives denote a polymerizable reactive additive, with at least a single polymerizable group, preferably two or more than two polymerizable groups. Further, reactive additives are for example selected from the below listed group of additives, which carry at least one polymerizable group: cross-linker such as described in EP 0 331 233, WO 95/24454, U.S. Pat. Nos. 5,567,349, 5,650,534, WO 00/04110, WO 00/07975, WO 00/48985, WO 00/55110 and WO 00/63154, which are herewith incorporated; diluent, liquid crystal, accelerators, dyes, inhibitors, activators, fillers, chain transfer inhibitor, pigments, anti-static agents, flame-retardant agents, thickeners, thixotropic agents, surface-active agents, viscosity modifiers, extending oils, plasticizers, tackifiers, catalysts, sensitizers, stabilizers, lubricating agents; dispersing agents, hydrophobing agents, adhesive agents, flow improvers, defoaming agents, deaerators, diluents, auxiliaries, colorants, dyes and pigments. Preferably, the polymerizable groups are selected from but is not limited to monomers bearing residues of norbornene, vinyl ether, vinyl ester, allyl ether, allyl ester, propenyl ether, allyl triazine, allyl isocyanurate, alkene, acrylate, unsaturated ester, imide, maleimide, methacrylate, acrylonitrile, styrene, diene, vinyl amide and alkyne polymerizable groups. Most preferably from the group given below:

alkyne, alkene, vinyl ether, vinyl ester, allyl ether, allyl ester, acrylate and methacrylate. Especially most preferably, the polymerizable group of the reactive additives having an unsaturated carbon-carbon bond are acrylate or methacrylate such as:

trimethylolpropane triacrylate; ethylene diacrylate; tetraethylene glycol diacrylate; 1,6-hexanediol diacrylate; pentaerythritol triacrylate; diethylene glycol diacrylate; 1,4-butanediol diacrylate; pentaerythritol tetraacrylate; 1,3-butanediol diacrylate; triethylene glycol diacrylate; neopentyl glycol diacrylate; 2-butene-1,4-diacrylate; 1,3-bis [(acryloxymethyl)phenethyl]tetramethyldisiloxane; tripropylene glycol diacrylate; trimethylolpropane ethoxylate triacrylate; 1,2-propanediol diacrylate; 1,3-propanediol diacrylate; 2,2,3,3,4,4,5,5-octafluorohexane-1,6-diacrylate; 1,5-pentanediol diacrylate; bisphenol a diacrylate; bisphenol a propoxylate diacrylate; 1,10-decanediol diacrylate; 2,2-dibromoneopentyl glycol diacrylate; 3,3'-dimethyl bisphenol "a" diacrylate; dipentaerythritol pentaacrylate; ethoxylated bisphenol a diacrylate; ethoxylated tetrabromo bisphenol a diacrylate; glyceryl propoxy triacrylate; 4,4'-(hexafluoroisopropylidene)diphenyl diacrylate; 1,9-nonanediol diacrylate; pentaerythritol dimethacrylate; hydroquinone diacrylate; sorbitol diacrylate; sorbitol pentaacrylate; 2,2',6,6'-tetrabromo bisphenol a diacrylate; 2,2',6,6'-tetrachloro bisphenol a diacrylate; tetraethoxy bisphenol a diacrylate; 2,2,3,3-tetrafluoro-1,4-butanediacrylate; thiol diethylene glycol diacrylate; 1,1,1-trimethylol ethane triacrylate; tris (2-hydroxy ethyl) isocyanurate triacrylate; 5-ethyl-5-(hydroxymethyl)-beta,beta-dimethyl-1,3-dioxane-2-ethanol diacrylate; 1,6-hexanediylbis[oxy(2-hydroxy-3,1-propanediyl)] bisacrylate; kayarad r-551; kayarad peg400da; 1,4-cyclohexanedimethyl 1,4-diacrylate; glycerol propoxylate triacrylate; dipentaerythritol penta- & hexa-acrylate; di(trimethylolpropane) tetraacrylate; neopentyl glycol ethoxylate diacrylate; pentaerythritol diacrylate monostearate; trimethylolpropane ethoxylate methyl ether diacrylate; (3-(allanoyloxy)-5-[4-(benzoylamino)-2-oxopyrimidin-1 (2h)-yl]tetrahydrofuran-2-y; 1,3-phenylene diacrylate; fluorescein dimethacrylate; 3-hydroxy-2,2-dimethylpropyl 3-hydroxy-2,2-dimethylpropionate diacrylate; 2,2',6,6'-tetrabromo bisphenol "a" diacrylate; bisphenol a glycerolate (1 glycerol/phenol) diacrylate; trimethylolpropane benzoate diacrylate; propylene glycol glycerolate diacrylate; tri(propylene glycol) glycerolate diacrylate; glycerol 1,3-diglycerolate diacrylate; hydroxypivalyl hydroxypivalate bis[6-(acryloyloxy)hexanoate]; 1,6-hexanediol propoxylate diacrylate; pentaerythritol propoxylate triacrylate; 1,6-hexanediol ethoxylate diacrylate; 2,2,3,3,4,4-hexafluoro-1, 5-pentyl diacrylate; 2,2,3,3,4,4,5,5-octafluoro-1,6-hexyl diacrylate; tricyclo[5.2.1.02,6]decanedimethanol diacrylate.

Non-reactive additives relate for example to antioxidants, accelerators, dyes, inhibitors, activators, fillers, pigments, anti-static agents, flame-retardant agents; stabilizing additives, such as curing inhibitors, or retardants, such as for example hydroquinone; p-tert.-butyl catechol; 2,6-di tert.-butyl-p-methylphenol; phenothiazine; N-phenyl-2-naphthylamine; thickeners, thixotropic agents, surface-active agents, viscosity modifiers, extending oils, plasticizers, tackifiers, catalysts, sensitizers, stabilizers, such as e.g. phenol derivatives, such as 4-ethoxyphenol or 2,6-di-tert-butyl-4-methylphenol (BHT), lubricating agents; dispersing agents, hydrophobing agents, adhesive agents, flow improvers, defoaming agents, deaerators, diluents, curing inhibitors, auxiliaries, colorants, dyes, pigments or a photoorientable monomer or oligomer or polymer as described in EP 1 090 325 B.

The composition is solid, or diluted in a solvent, which is an organic solvent and/or water, as a solution, gel, dispersion or emulsion.

Preferably, the composition is a clear solution. The solvent or solvent mixture used in the present application may be any compound that can dissolve the composition (VI) according to the invention. At least one solvent such as a common polar solvent or a nonpolar solvent may be used. The solvents which are particularly preferred are those leading to a good coatability or printability of the solution of the material to the substrate to be coated.

Non-polar solvents are compounds that have low dielectric constants and are not miscible with water, such as for example hexane, benzene, toluene, diethyl ether, chloroform, ethyl acetate, dichloromethane. Polar solvents are aprotic or protic. Polar aprotic solvents are solvents that share ion dissolving power with protic solvents but lack an acidic hydrogen. These solvents generally have high dielectric constants and high polarity. Examples are 1,4-dioxane, tetrahydrofuran (THF), acetone, acetonitrile (MeCN), dimethylformamide (DMF), dimethyl sulfoxide (DMSO), N-methylpyrrolidone (NMP), ethylpyrrolidone, N-vinylpyrrolidone, 2-butoxyethanol (BC), gamma.-butyrolactone (BL), N-methylmorpholine, gamma.-butyrolactone, acetonitrile, ethylcarbitol, butylcarbitol, ethylcarbitol acetate, ethylene glycol, propylene glycol monoacetate, propylene glycol diacetate, dipropylene glycol, and dipropylene glycol monomethyl ether, chlorobenzene, tetrahydrofuran, butylcellosolve, cyclopentanone (CP), methylethylketone (MEK), ethyl acetate (EA), anisole (AN), cyclohexanone (CHN), methyl isobutyl ketone (MIBK), 1-methoxy-2-propanol acetate (MPA), N,N-dimethyl-formamide (DMF), dichloromethane, gamma-butyrolactone (BL), and mixtures thereof. Polar protic solvents are solvents, which contain dissociable H+, such as hydrogen fluoride. The molecules of such solvents can donate an H+(proton). Conversely, aprotic solvents cannot donate hydrogen bonds. Common characteristics of protic solvents are to display hydrogen bonding, to have an acidic hydrogen (although they may be very weak acids), to be able to stabilize ions (cations by unshared free electron pairs, anions by hydrogen bonding). Examples are acetic acid, n-butanol, isopropanol, n-propanol, ethanol, methanol, formic acid and water.

Preferably the organic solvents used in the present application are protic or aprotic polar or non-polar solvents. Preferred solvents are, however not limited to:

ketones such as for example acetone, cyclopentanone (CP), cyclohexanone (CH), methyl isobutyl ketone (MIBK), methylethylketone (MEK), amides such as N,N-dimethylformamide (DMF), N-methylpyrrolidone (NMP), M-ethylpyrrolidone, N-vinylpyrrolidone, N,N-dimethylacetamide, carbamates ether such as anisole (AN), tetrahydrofuran (THF), ethylene glycol, dipropylene glycol, butylcarbitol, ethylcarbitol acetate, dipropylene glycol monomethyl ether, ester such as ethyl acetate (EA), 1-methoxy-2-propanol acetate (MPA), gamma-butyrolactone (BL), propylene glycol monoacetate, propylene glycol diacetate, dipropylene glycol monomethyl ether, alcohols, such as 2-butoxyethanol (BC), ethylcellosolve, butylcellosolve, dimethyl sulfoxide (DMSO), halogen hydrocarbons such as dichloromethane, chlorobenzene, apolar solvents as for example, however not limited to hydrocarbons, such as hexane, heptane, toluene; petrolether.

and mixtures thereof.

More preferred solvents are acetone, cyclopentanone (CP), cyclohexanone (CH), methyl isobutyl ketone (MIBK), methylethylketone (MEK), N,N-dimethylformamide (DMF), N-methylpyrrolidone (NMP), N-ethylpyrrolidone, N-vinylpyrrolidone, N,N-dimethylacetamide, (AN), tetrahydrofuran (THF), ethylene glycol, dipropylene glycol, butylcarbitol, ethylcarbitol acetate, dipropylene glycol monomethyl ether, ethyl acetate (EA), 1-methoxy-2-propanol acetate (MPA), gamma-butyrolactone (BL), butylcellosolve (BC), dichloromethane, propylene glycol monoacetate, propylene glycol diacetate, dipropylene glycol monomethyl ether, anisole (AN), N,N-dimethylformamide (DMF), dimethyl sulfoxide (DMSO) and mixtures thereof.

Most preferred are cyclopentanone (CP), cyclohexanone (CH), methyl isobutyl ketone (MIBK), methylethylketone (MEK), ethyl acetate (EA), 1-methoxy-2-propanol acetate (MPA), dimethyl sulfoxide (DMSO), anisole (AN), N,N-dimethylformamide (DMF), dichloromethane, gamma-butyrolactone (BL), N-methylpyrrolidone (NMP), butylcellosolve (BC) and mixtures thereof.

The amount of the reactive or non reactive additives in the composition (VI) is determined according to the wished performances in respect of orientation capability of the photoalignment layer and of its mechanical and thermal stability, as well as of its optical and electrooptical performances. Preferably, the reactive or non reactive additives have an amount of 0.1 to 50% by weight of the composition, preferably an amount of 1 to 30% by weight, even more preferably an amount of 1 to 10% by weight.

In case the compositions of the invention comprise a stabilizer, the latter is generally present in an amount of 0.01 to 5% by weight of the composition, preferably in an amount of 0.1 to 1% by weight.

The initiator is employed in an amount effective for initiating cure of the formulation. The effective amount depends upon the process parameters and starting material properties. Typically, the amount ranges from 0.1 to 10% by weight relative to the total weight % of the composition, preferably from 0.5 to 8% by weight, more preferred from 1 to 5% by weight. Combinations of two or more initiators (photo- or thermal initiators) may also be employed.

Preferred is a composition comprising a molar ratio of thiol groups of the polythiol (V) to the unsaturated carbon-carbon bonds, which is <2; preferably which is in the range from about 0.1-1.5; more preferably 0.2-1; most preferably 1.

The solvent is used to aid the coating of the composition (VI). Typical concentrations of the composition disposed in a solvent are between 1 and 50%, preferred between 1 and 10% by weight of the active ingredients, such as the polythiol (V), the photoreactive compound (I), and optionally the reactive and/or non-reactive additive(s), the initiator(s), in said solvent(s).

In a further embodiment the present invention concerns the use of a composition (VI) or the photoreactive compound according to the present invention for the preparation of photoalignment material.

The present invention relates also to photoalignment materials comprising composition (VI) or the photoreactive compound.

The compounds of the invention may be readily prepared using methods that are well known to the person skilled in the art, such as those documented in Houben-Weyl, *Methoden der Organischen Chemie*, Thieme-Verlag, Stuttgart, or in U.S. Pat. No. 6,630,076 or WO 2005/054406.

The present invention also relates to a process for the preparation of photoalignment material, preferably photoalignment layer, comprising a) applying a composition (VI), wherein said composition has the same meaning and preferences as given above; and then b) optionally drying, and then c) polymerizing the applied composition (VII) obtained after step a) or step b), preferably polymerizing with heat or with light irradiation, and then irradiating the applied composition (VII) obtained after step c) with aligning light to induce the anisotropy, or d) simultaneously polymerizing and irradiating the applied composition (VII), obtained after step a) or step b), with aligning light to induce the anisotropy.

The applied composition (VII) is preferably a film.

In general, for the polymerization, the photoreactive compound and at least the polythiol (V), and optionally the reactive and/or non-reactive additive(s), the initiator(s) and the solvent(s) are firstly prepared separately from the individual components that are blended.

Subsequently the formation of the polymers is effected in a manner known per se for any given polymer for example under the influence of UV radiation or heat and/or by the action of radical or ionic catalysts.

In general, the polymerization of the monomeric applied composition (VII) is conducted in an inert atmosphere such as nitrogen, carbon dioxide and argon, or in an atmosphere containing oxygen, preferably with an amount of $0.1 \leq$ oxygen $\leq 50\%$; more preferably $1 \leq$ oxygen $\leq 25\%$; most preferably in an inert atmosphere or in air; most preferably in an inert atmosphere.

In general, the composition (VI) is applied by general coating and printing methods known in the art on a substrate. Coating methods are for example spin coating, air doctor coating, blade coating, knife coating, reverse-roll coating, transfer roll coating, gravure roll coating, kiss roll coating, cast coating, spray coating, slot-orifice coating, calendar coating, electrodepositing coating, dip coating or die coating.

Printing methods are for example relief printing such as flexographic printing, ink jet printing, intaglio printing such as direct gravure printing or offset gravure printing, lithographic printing such as offset printing, or stencil printing such as screen printing.

The substrate is in general glass or plastic, which is optionally coated with indium tin oxide (ITO).

The layer thickness of the composition on the substrate is preferably higher than 5 nm, more preferably between 20 and 500 nm, most preferably between 30 and 300 nm.

It depends on the consistence of the composition whether a drying step is conducted. If solvents are comprised by the composition, the composition is usually dried after the applying step.

In general "drying" consists in the extraction of the solvent(s) for example by application of heated gas using for example an air stream that applies the heat by convection and carries away the vapor of solvents (convective or direct drying). Drying is faster at higher temperatures. Product or film qualities also have to be considered in the determination of the temperature applied for the drying. Other possibilities are vacuum drying, where heat is supplied by contact conduction or radiation (or microwaves) while the produced vapor is removed by the vacuum system; indirect or contact drying (heating through a hot wall), as drum drying, vacuum drying; dielectric drying (radiofrequency or microwaves being absorbed inside the material); freeze drying or lyophilization; mechanical extraction of the solvent.

Preferably, the polymerization and the induction of the anisotropy in the applied composition (VII) are usually conducted in two steps, by heating it and then irradiating it with aligning light. The heating step can be replaced by irradiation with aligning light. It is also possible to conduct the polymerisation in one step by radiation with aligning light.

The polymerization is performed by applying energy to the applied composition (VII) after step b), preferably in the form of heat or of light:

The heating temperature and time are selected as a function of the formulation composition, and preferably of the thermal initiator which is used to initiate polymerization of the film, and is preferably >50° C., more preferably >80° C., most preferably >130° C. The heating time is dependent, inter alia, on the reactivity of the polymerizable material, the thickness of the coated layer, the type of the polymerization initiator, the atmosphere in which the curing is performed, and is preferably >5 min, more preferably >15 min, most preferably >30 min.

When light is used for the polymerization step, a lamp is conventionally used for photo-polymerization. The intensity of the lamp used for the irradiation is selected depending on the kind of starting materials and process parameters, and should be preferably higher than 0,2 mW/cm². Most likely the polymerization reaction may be initiated by most any actinic light source. Conventionally, polymerization is accomplished at ordinary room temperature conditions. A class of actinic light useful herein is ultraviolet light and other forms of actinic radiation which are normally found in radiation emitted from the sun or from artificial sources such as Type RS Sunlamps, carbon arc lamps, xenon arc lamps, mercury vapor lamps, tungsten halide lamps and the like. Ultraviolet radiation may be used most efficiently if the photocurable composition contains a suitable photo-polymerization rate accelerator. Polymerization periods may be adjusted to be very short and hence commercially economical by proper choice of ultraviolet source, photo-polymerization rate accelerator and concentration thereof, temperature and molecular weight, and the photoreactive compound and polythiol.

Instead of a UV lamp also an electron beam (EB) can be used. This curing method does not necessarily require an initiator Step d) is performed by applying "aligning light" to the applied composition (VII) after step c).

The term "aligning light" is light of wavelengths, which can induce anisotropy in the photoalignment layer. Preferably, the wavelengths are in the UV-A, UVB and/or UV/C-range, or in the visible range. It depends on the photoalignment compound, which wavelengths are appropriate. Preferably, the photo-reactive groups are sensitive to visible and/or UV light. The UV light is preferably selected according to the absorption of the photo-reactive groups, i.e. the absorption of the film should overlap with the emission spectrum of the lamp used for the LP-UV irradiation, more preferably with linearly polarized UV light. The intensity and the energy used are chosen depending on the photosensitivity of the material and on the orientation performances which are targeted. In most of the cases, very low energies (few mJ/cm2) already lead to high orientation quality.

More preferably, "aligning light" is at least partially linearly polarized, elliptically polarized, such as for example circularly polarized, or non-polarized, most preferably circularly polarized, or non-polarized light exposed obliquely, or at least partially linearly polarized light. Especially, most preferred aligning light denotes substantially polarised light, especially linearly polarised light; or aligning light denotes non-polarised light, which is applied by an oblique irradiation.

More preferably, the aligning light is UV light, preferably linearly polarized UV light.

The type of initiator that is selected for the composition (VI) depends on the processes c) and d) that are used for the polymerization of the monomeric applied composition (VII). If heat is selected for the polymerization, then preferably no initiator or at least a thermal initiator is used. If light curing is used for the polymerization, then preferably no initiator or at least a photoinitiator is used.

If light irradiation is used for the polymerization, preferably the photoinitiator of the composition (VI) absorbs light in a different spectral range than the photoreactive group. More preferably, UVA light is used for the polymerization of the polymerizable composition (VI) and the UVB aligning light is used, or the reverse.

Further, the present invention relates to an applied composition (VII), which is obtainable according to the process steps a) and optionally b), and c) or d) as described above.

The present invention also relates to a photoalignment material obtainable by the processes as described above. Preferably, the photoalignment material is in a network, and more preferably the photoalignment material is a structured or unstructured photoalignment layer.

The term "structured" refers to a variation in the azimuthal orientation, which is induced by locally varying the direction of the polarized aligning light.

In addition, the present invention relates to the use of the photoalignment material according to the present invention as a photoalignment layer, for aligning organic or inorganic compounds, especially for aligning liquid crystals.

The present invention also relates to the use of the photoalignment material of the invention in the manufacture of optical or electro-optical component and systems, especially multilayer systems, or devices for the preparation of a display waveguide, a security or brand protection element, a bar code, an optical grating, a filter, a retarder, a compensation film, a reflectively polarizing film, an absorptive polarizing film, an anisotropically scattering film compensator and retardation film, a twisted retarder film, a cholesteric liquid crystal film, a guest-host liquid crystal film, a monomer corrugated film, a smectic liquid crystal film, a polarizer, a piezoelectric cell, a thin film exhibiting non linear optical properties, a decorative optical element, a brightness enhancement film, a component for wavelength-band-selective compensation, a component for multi-domain compensation, a component of multiview liquid crystal displays, an achromatic retarder, a polarization state correction/adjustment film, a component of optical or electro-optical sensors, a component of brightness enhancement film, a component for light-based telecommunication devices, a G/H-polarizer with an anisotropic absorber, a reflective circular polarizer, a reflective linear polarizer, a MC (monomer corrugated film), twisted nematic (TN) liquid crystal displays, hybrid aligned nematic (HAN) liquid crystal displays, electrically controlled birefringence (ECB) liquid crystal displays, supertwisted nematic (STN) liquid crystal displays, optically compensated birefringence (OCB) liquid crystal displays, pi-cell liquid crystal displays, in-plane switching (IPS) liquid crystal displays, fringe field switching (FFS) liquid crystal displays, vertically aligned (VA) liquid crystal displays; all above display types are applied in either transmissive or reflective or transflective mode.

The optical or electro-optical component and systems, especially multilayer systems and devices can be patterned or unpatterned.

The term patterning preferably denotes to birefringence patterning and/or thickness patterning and/or patterning of the optical axis orientation, and/or patterning of the degree of polymerization. Birefringence denotes the difference between the extra-ordinary and the ordinary index of refraction.

Thus the invention further relates to an optical or electro-optical elements, systems and devices device comprising photoalignment material, within the above given meaning and preferences.

Preferred are optical or electro-optical elements, systems and devices comprising photoalignment layer according to the present invention and at least one orientable layer, such as a liquid crystal layer or liquid crystal polymer layer.

An optical component, system or device creates, manipulates, or measures electromagnetic radiation.

An electro-optical component, system or device operates by modification of the optical properties of a material by an electric field. Thus it concerns the interaction between the electromagnetic (optical) and the electrical (electronic) states of materials.

The photoalignment material has the ability to align compounds, such as for example nematic liquid crystals, with their long axis along a preferred direction.

The present invention also relates to the use of the photoalignment material according to the present invention, preferably in cross-linked form, as a photoalignment layer, for aligning organic or inorganic compounds, especially for aligning liquid crystals.

The term "anisotropy" or "anisotropic" refers to the property of being directionally dependent. Something which is anisotropic may appear different or have different characteristics in different directions.

Preferred is the use for the induction of planar alignment, tilted or vertical alignment of adjacent liquid crystalline layers; more preferred is the use for the induction of planar alignment or vertical alignment in adjacent liquid crystalline layers.

The gist of the present invention lies in the utilization of the thiol, preferably polythiol of formula (V) for the networks. The inventors have found that by the adjunction of monomers bearing thiol moieties, exceptionally high photosensitivities and alignment performances could be achieved. This fact vastly facilitates the manufacture of the networks and alignment layers sought using much reduced energy in comparison to former processes. Moreover, the orientation properties of the alignment layers are considerably improved in comparison with similar, known alignment layers prepared from low molecular weight photo-crosslinkable materials as described in U.S. Pat. No. 6,610,462 B1. Furthermore, very high concentrations of initiator (10-20 weight % of Irgacure 369) were required for the preparation of the photoaligned film which might lead to undesirable effects on the LC alignment quality and/or on the LCD performances.

The inventors were able to synthesize a broad range of different photo-crosslinkable materials of different molecular weights having various absorption properties which offer the possibility to better fit the absorption characteristics of these materials to the emission spectrum of the applied aligned light.

The characteristics of the resulting polymer or network can be targeted to desired performances by controlling the thermal and photo-curing process.

EXAMPLES

The examples which follow further illustrate the invention. They are given by way of illustration and not by way of limitation. Variations on these examples falling within the scope of the invention will be apparent to a person skilled in the art.

These examples are devoted to illustrate the ability of the materials and process described herein to orient liquid crystals (LCD devices) or liquid crystal monomers i.e. liquid crystal polymers (LCP) (optical film applications).

The preparation and evaluations of optical films are described in the examples 1, 2, 1A and 2B. The preparation and evaluations of optical films are described in the examples 3.

The following nomenclature is used for the materials described in the following examples:

AD1—Pentaerythritol tetrakis(3-mercaptopropionate)

AD2—Photoinitiator (Irgacure 2959)

AD3—Thermal initiator (Benzoyl peroxide)

AD4—Photoinitiator (Irgacure 369)

AD5—Photoinitiator (Irgacure 819)

AD6—Photoinitiator (Darocur TPO)

AD7—Photoinitiator (Irgacure 784)

AD8—Photoinitiator (Irgacure 184)

AD9—Photoinitiator (Dimethoxy-2-phenyl-acetophenone, DMPA)

LCP (1) 2,5-bis[4-6-acryloyloxyhexyloxy)benzoyloxy]benzoic acid pentyl ester commercially available from ROLIC Technologies, Switzerland or prepared in analogy to Schemes 1, 2, 3, 4 of U.S. Pat. No. 5,593,617

"wgt %" denotes "% by weight"

A polymerizable composition M1 is prepared as follows:

| Composition M1 | |
| --- | --- |
| Compound | Weight (%) |
| LCP (1) | 97.0 |
| Irgacure ® 369, photoinitiator, 2-benzyl-2-dimethylamino-1(4-morpholinophenyl) butanone-1 from CIBA Specialty Chemicals Inc. | 1.0 |
| Tinuvin ® 123, bis(1-octyloxy-2,2,6-tetramethyl-4-piperidyl) sebacate from CIBA Specialty Chemicals Inc. | 1.0 |
| Butyl-hydroxy-toluol (BHT), from Aldrich | 1.0 |

A solution of the composition M1 in cyclopentanone, 30 WT %, is stirred for 30 minutes at room temperature.

Example 1

The mixture comprises:
74.29 wgt % of Mon1

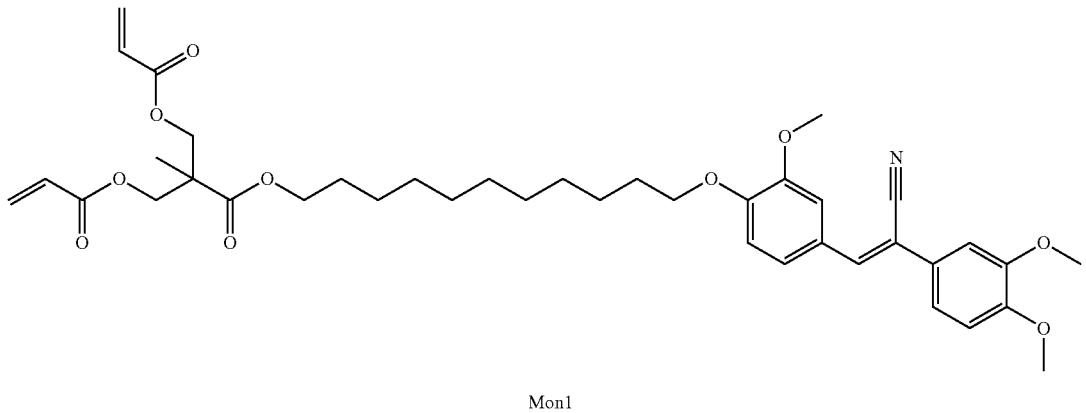 [SMILES: C=CC(=O)OCC(C)(COC(=O)C=C)C(=O)OCCCCCCCCCCCOc1ccc(/C=C(\C#N)c2ccc(OC)c(OC)c2)cc1OC]

Mon1

25.71 wgt % of Pentaerythritol tetrakis(3-mercaptopropionate) (AD1)

A 5wgt % solution composed of Mon1 (74.29 wgt %) and pentaerythritol tetrakis(3-mercaptopropionate) (25.71 wgt %) was prepared in cyclopentanone (CP), then stirred for 15 min at RT and filtrated with a 0.45 µm filter. The composition (5 wgt % in CP) was spin-coated at 1000 rpm onto glass plates for 60 s (acceleration=2000). The films (ca. 150 nm layer thicknesses) were subsequently heated respectively at 100, 160 and 180° C. for 1 h under air. Afterwards the glass plates were cooled down and irradiated with linearly polarized UVA light (Energy=2/4/8/16/32/64 mJ/cm$^2$; Intensity=0.60 mW/cm$^2$). After this irradiation, a solution of composition M1 (30 wgt % CP) was spin-coated at 3450 rpm onto the substrate coated with the alignment layer for 60 s (acceleration=2000). The LCP films were annealed at 50° C. for 2 min and finally cross-linked under nitrogen with non polarized UVA light (500 mJ/cm$^2$) and the resulting orientation performances were evaluated:

| Curing conditions | 1 h-100° C. | 1 h-160° C. | 1 h-180° C. |
|---|---|---|---|
| Alignment quality at 2/4/8/16/32/64 mJ/cm$^2$ | 0/0/0/0/0/0 | 0/0/+/+/++/++ | +/+/++/++/++/++ |

Legend:
0 No orientation
+ Good orientation
++ Very good orientation

The best orientation performances were obtained for the film heated at 180° C. for 60 min whereby the film is well oriented for energies >2 mJ/cm$^2$.

The examples given in the table A (Examples 1A) were performed according to the experimental conditions described above.

The synthesis of Mon1 is described below:

2-[(acryloyloxy)methyl]-3-{11-{4-[2-cyano-2-(3,4-dimethoxyphenyl)vinyl]-2-methoxyphenoxy}-undecyloxy}-2methyl-3-oxopropyl acrylate

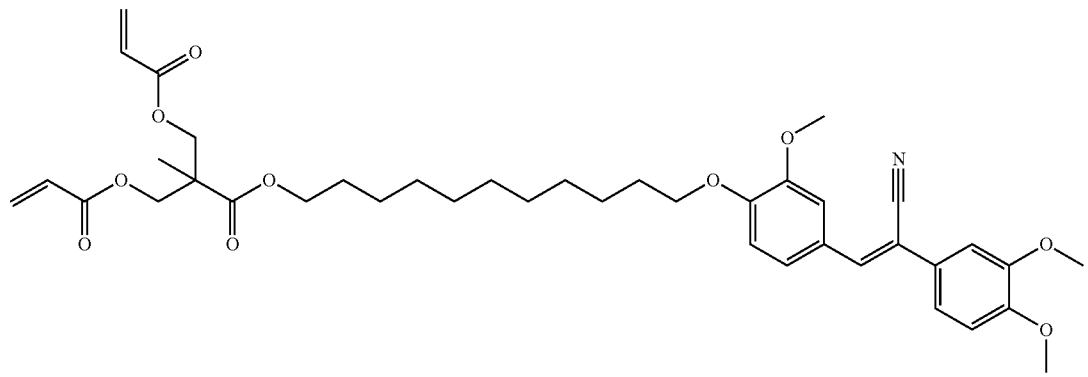

Mon1

3.0 g (5.02 mmol) of 11-{4-[2-cyano-2-(3,4-dimethoxyphenyl)vinyl]-2-methoxphenoxy}-undecyl-3-hydroxy-2-(hydroxymethyl)-2methylpropionate were dissolved in 40 ml $CH_2Cl_2$. 1.68 ml (12.04 mmol) of triethylamine and 0.12 g (1.00 mmol) of 4-Dimethylaminopyridine (DMAP) were added. The solution was cooled down to 0° C. and 0.90 ml (11.04 mmol) of acrylic acid chloride were added. After 2 h reaction at 0 C., the solution was then allowed go to room temperature. After 15 h reaction, the resulting solution was extracted with $CH_2Cl_2$. The organic phase was washed with water, dried over $Na_2SO_4$, filtered and solvent was removed under reduced pressure. The crude product was purified by flesh chromatography using 1:1 Ethyl acetate/$CH_2Cl_2$ and then crystallized from mixture of Ethyl acetate/Hexane and dried overnight under vacuum.

1.78 g (2.52 mmol) of 2-[(acryloyloxy)methyl]-3-(11-{4-[2-cyano-2-(3,4-dimethoxyphenyl)vinyl]-2-methoxyphenoxy}-undecyloxy}-2methyl-3-oxopropyl acrlyate as a yellow solid were obtained (50.3 wgt % yield).

11-{4-[2-cyano-2-(3,4-dimethoxyphenyl)vinyl]-2-methoxyphenoxy}-undecyl-3-hydroxy-2-(hydroxymethyl)-2methylpropionate

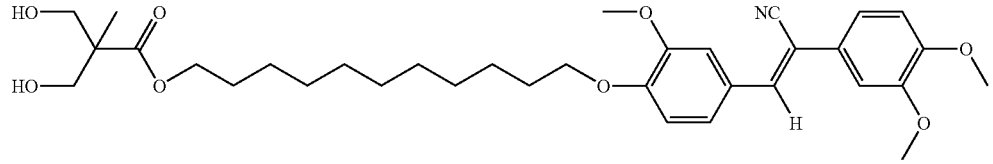

3.4 g (5.33 mmol) of 11-{4-[2-cyano-2-(3,4-dimethoxyphenyl)vinyl]-2-methoxyphenoxy}-undecyl-2,2,5-trimethyl-1,3-dioxane-5-carboxylate were mixed with 50 ml MeOH and 0.46 g of Dowex 50W (cation exchange resin) were added. The solution was stirred over night at room temperature. The resulting mixture was filtered under celite and solvent was removed under reduced pressure. The final product was dried overnight under vacuum. 3.01 g (5.03 mmol) of 11-{4-[2-cyano-2-(3,4-dimethoxyphenyl)vinyl]-2-methoxyphenoxy}-undecyl-3-hydroxy-2-(hydroxymethyl)-2methylpropionate as a yellow powder were obtained (94.4 wgt % yield).

11-{4-[2-cyano-2-(3,4-dimethoxyphenyl)vinyl]-2-methoxyphenoxy}-undecyl-2,2,5-trimethyl-1,3-dioxane-5-carboxylate 5.00 g (40.38 mmol) of 11-{4-[2-cyano-2-(3,4-dimethoxyphenyl)vinyl]-2-methoxyphenoxy}-undecan-1-ol, 1.99 g (11.42 mmol) of 2,2,5-trimethyl-1,3-dioxane-5-carboxylic acid and 0.15 g (1.26 mmol) of 4-Dimethylaminopyridine were dissolved in 50 ml $CH_2Cl_2$. 3.13 g (16.33 mmol) of EDC, 1-Ethyl-3-(3-dimethylaminopropyl)carbodiimide; were added to the solution at room temperature and the reaction was stirred over night at RT. The solvent was evaporated and the crude material was purified by flash chromatography using 1:1 Ethyl acetate/$CH_2Cl_2$. The solvent was removed under reduced pressure and the final product was dried overnight under vacuum.

3.42 g (5.36 mmol) of 11-{4-[2-cyano-2-(3,4-dimethoxyphenyl)vinyl]-2-methoxyphenoxy}-undecyl-2,2,5-trimethyl-1,3-dioxane-5-carboxylate as a yellow powder were obtained (51.7 wgt % yield).

2,2,5-trimethyl-1,3-dioxane-5-carboxylic acid

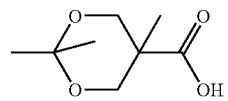

50.0 g (372.8 mmol) of 2.2-Bis(Hydroxymethyl) propionic acid and 69.0 ml of Dimethoxypropan were mixed with 250 ml Aceton. 3.55 g (18.66 mmol) of p-Toluenesulfonic acid were added. The solution was stirred for 2 h and then the solvent was removed. The crude product was dissolved in $CH_2Cl_2$ and washed with water. The organic phase was washed with water, dried over $Na_2SO_4$, filtered and solvent was removed under reduced pressure.

41.7 g (239.38 mmol) of 2,2,5-trimethyl-1,3-dioxane-5-carboxylic acid as white solid were obtained (64.2 wgt % yield).

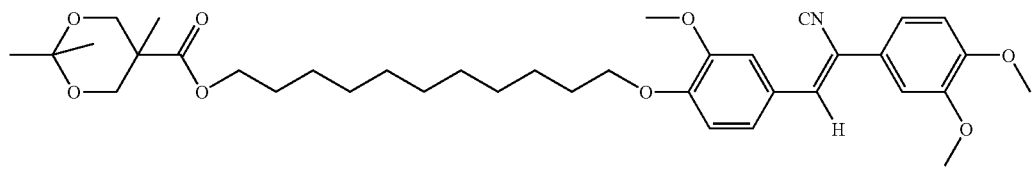

11-{4-[2-cyano-2-(3,4-dimethoxyphenyl)vinyl]-2-methoxyphenoxy}-undecan-1-ol

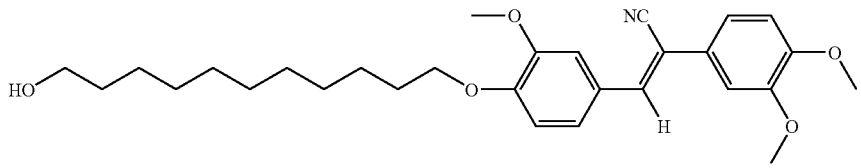

64.98 g (197.2 mmol) of 4-[(11-hydroxyundecyl)oxy]-3-methoxybenzaldehyde were dissolved in 400 ml tert-Butyl methyl ether. 34.99 g (197.2 mmol) of (3,4-dimethoxyphenyl)acetonitrile were added at room temperature to the solution. Then, 4.82 g (39.4 mmol) of potassium tert-butoxyde were added to the dark yellow solution which was stirred for 20 h at 65° C. The yellow suspension was then poured on 1 l icy water containing 20 ml acetic acid. The precipitate was filtrated, washed with water and dried overnight at 60° C. under vacuum. 82.82 g (171.95 mmol) of 11-{4-[2-cyano-2-(3,4-dimethoxyphenyl)vinyl]-2-methoxyphenoxy}-undecan-1-ol as a yellow solid were obtained (87.2 wgt % yield).

4-[(11-hydroxyundecyl)oxy]-3-methoxybenzaldehyde

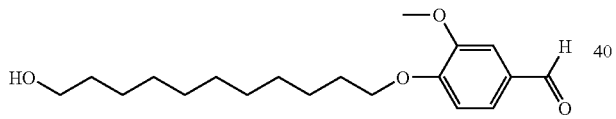

30.0 g (197.2 mmol) of 4-hydroxy-3-methoxybenzaldehyde and 45.3 g (216.9 mmol) of 11-bromoundecan-1-ol were dissolved in 300 ml N,N-Dimethylformamide. 29.98 g (216.9 mmol) of potassium carbonate and 3.15 g (19.7 mmol) of potassium iodide were added and the suspension was heated to 80° C. After 12 h, the reaction was finished and sodium thiosulfate was added to the mixture which was then poured on 1 l icy water containing 20 ml acetic acid. The precipitate was filtrated, washed with water and dried overnight at 60° C. under vacuum.

63.5 g (196.9 mmol) of 4-[(11-hydroxyundecyl)oxy]-3-methoxybenzaldehyde as a white solid were obtained (100 wgt % yield).

Example 2

The mixture comprises:

84.85 wgt % of Mon2

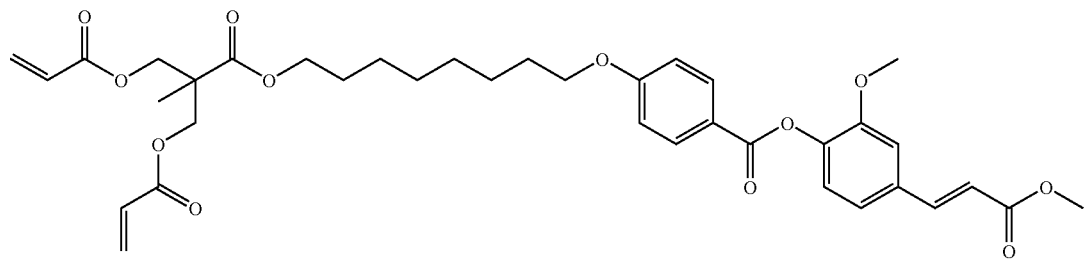

Mon2

10.15 wgt % of Pentaerythritol tetrakis(3-mercaptopropionate)

5 wgt % of Irgacure 2959 (AD2)

A 5 wgt % solution comprising the components given above was prepared in cyclopentanone (CP), then stirred for 15 min at RT and filtrated with a 0.45 µm filter. The composition was spin-coated at 1000 rpm onto glass three substrates for 60 s (acceleration=2000). The films (ca. 150 nm layer thickness) were then dried under vacuum at RT for 15 min and irradiated as follows:

1) Irradiation with linearly polarized UVB light (E=10/20/40/60/80/100 mJ/cm$^2$; Intensity=2.3 mW/cm$^2$) under nitrogen
2) Irradiation under air with non-polarized UVA light (500 mJ/cm$^2$) and then with linearly polarized UVB light (E=10/20/40/60/80/100mJ/cm$^2$; Intensity=2.3 mW/cm$^2$).
3) Irradiation under nitrogen with non-polarized UVA light (500 mJ/cm$^2$) and then with linearly polarized UVB light (E=10/20/40/60/80/100 mJ/cm$^2$; Intensity=2.3 mW/cm$^2$).

After this irradiation, a solution of composition M1 (30 wgt % in CP) was spin-coated at 3450 rpm onto the coated substrate for 60 s (acceleration=2000). The LCP film was then annealed at 50° C. for 2 min and finally cross-linked under nitrogen with non-polarized UVA light (500 mJ/cm$^2$).

The best orientation performances were observed for the film first pre-irradiated with UVA under nitrogen and subsequently irradiated with LP-UVB (Variant 3), whereby the orientation was good for LP-UVB energies >10 mJ/cm$^2$.

| Curing conditions | Orientation |
|---|---|
| Variant 1:<br>LP-UVB = 10/20/40/60/80/100 mJ/cm$^2$ | 0/0/0/0/0/+ |
| Variant 2:<br>1) UVA = 500 mJ/cm$^2$ under air<br>2) LP-UVB = 10/20/40/60/80/100 mJ/cm$^2$ | 0/0/+/++/++/++ |
| Variant 3:<br>1) UVA = 500 mJ/cm$^2$ under nitrogen<br>2) LP-UVB = 10/20/40/60/80/100 mJ/cm$^2$ | +/+/++/++/++/++ |

Legend:
0 No orientation
+ Good orientation
++ Very good orientation

The examples given in the table B (Example 2B) were performed according to the experimental conditions described above.

Mon2 was synthesized in an analogous manner as described for Mon1 and Mon3.

Examples 1A

The coating, curing and evaluation for the following examples are performed in a similar manner as described for example 1.

TABLE A

| Structure of monomer | Formulation composition (wgt %) | Curing conditions: Thermal curing: at 180° C. for 60 min UV curing with: 2/4/8/16/32/64 mJ/cm$^2$ |
|---|---|---|
| 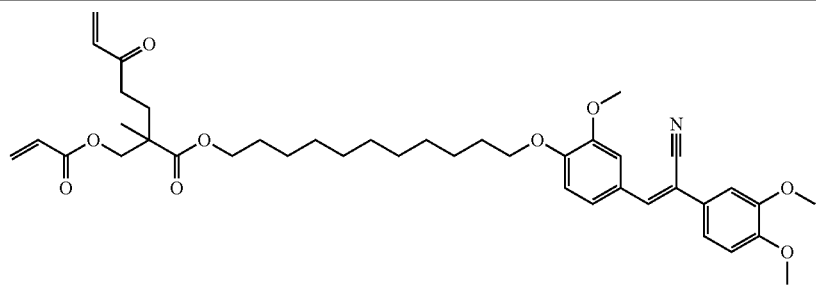<br>Mon1 | Mon1-74.29<br>AD1-25.71<br>Mon1-72.15<br>AD1-23.97<br>AD3-3.88 | Good orientation for E > 2 mJ/cm$^2$<br>+/+/++/++/++/++<br>Good orientation for E > 2 mJ/cm$^2$<br>+/+/++/++/++/++ |
| 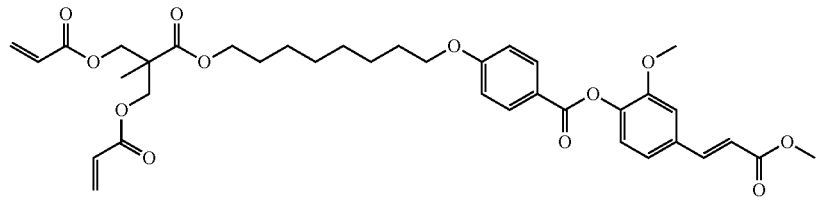<br>Mon2 | Mon1-73.58<br>AD1-26.42<br>Mon2-70.64<br>AD1-25.36<br>AD3-4 | Good orientation for E > 4 mJ/cm$^2$<br>0/+/+/+/++/++<br>Good orientation for E > 4 mJ/cm$^2$<br>0/+/+/+/++/++ |
| 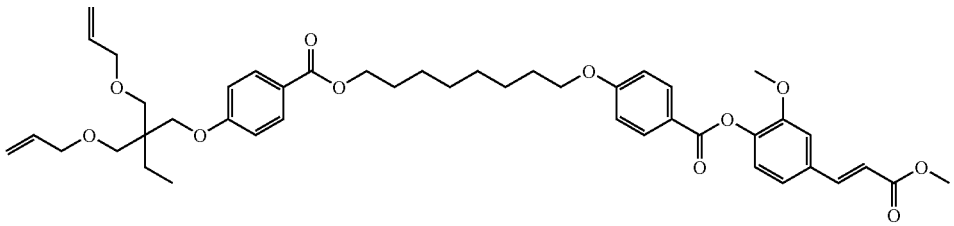<br>Mon3 | Mon3-72.95<br>AD1-23.05<br>AD3-4 | Good orientation for E > 64 mJ/cm$^2$<br>0/0/0/0/0/+ |

TABLE A-continued

| Structure of monomer | Formulation composition (wgt %) | Curing conditions: Thermal curing: at 180° C. for 60 min UV curing with: 2/4/8/16/32/64 mJ/cm² |
|---|---|---|
| Mon4 | Mon4-70.95 AD1-25.05 AD3-4 | Good orientation for E > 64 mJ/cm² 0/0/0/0/0/+ |
| Mon7 | Mon7-72.5 AD1-27.5 | Good orientation for E > 64 mJ/cm² 0/0/0/0/0/+ |
|  | Mon7-71.0 AD1-27.0 AD3-2 | Good orientation for E > 16 mJ/cm² 0/0/0/+/+/++ |
| Mon8 | Mon8-58.8 AD1-41.2 | Good orientation for E > 2 mJ/cm² +/+/+/++/++/++ |
|  | Mon8-56.5 AD1-39.5 AD3-4 | Good orientation for E > 2 mJ/cm² +/+/+/++/++/++ |
|  | Mon8-53 AD1-37 AD3-10 | Good orientation for E > 2 mJ/cm² +/+/+/++/++/++ |
| Mon9 | Mon9-56.5 AD1-39.5 AD3-4 | Good orientation for E > 2 mJ/cm² +/+/++/++/++/++ |
| Mon10 | Mon10-66.85 AD1-31.15 AD3-2 | Good orientation for E > 32 mJ/cm² 0/0/0/0/+/++ |

TABLE A-continued

| Structure of monomer | Formulation composition (wgt %) | Curing conditions: Thermal curing: at 180° C. for 60 min UV curing with: 2/4/8/16/32/64 mJ/cm² |
|---|---|---|
| 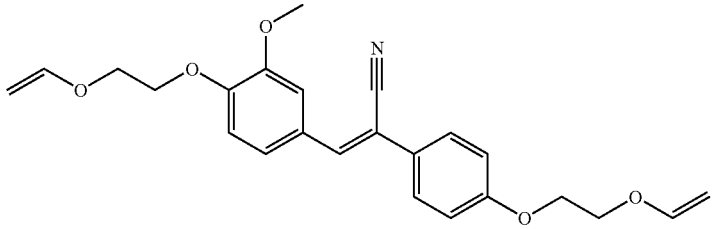<br>Mon12 | Mon-62.5<br>AD1-37.5<br><br>Mon-60<br>AD1-36<br>AD3-4 | Good orientation for E > 2 mJ/cm²<br>+/+/+/+/++/++<br>Good orientation for E > 2 mJ/cm²<br>+/+/++/++/++/++ |

All monomers mentioned in the table were synthesized in an analogous manner as described for Mon1 and Mon3.

Examples 2B

The coating, curing and evaluation are performed in a similar manner as described for example 2.

TABLE B

| Structure of monomer | Formulation composition (wgt %) | Curing conditions: Variant 3 |
|---|---|---|
| 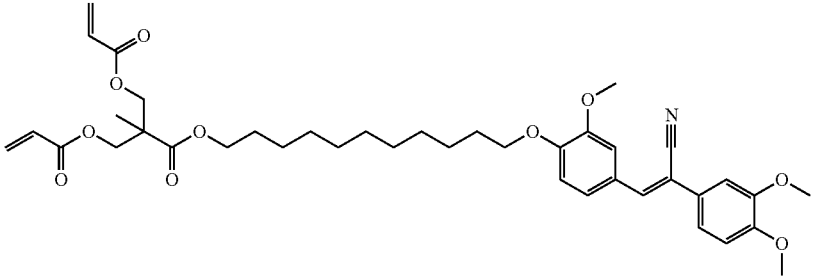<br>Mon1 | Mon1-70.57<br>AD1-24.43<br>AD5-5 | Good orientation for E > 100 mJ/cm²<br>0/0/0/0/0/+ |
| | Mon1-70.57<br>AD1-24.43<br>AD6-5 | Good orientation for E > 80 mJ/cm²<br>0/0/0/0/+/+ |
| | Mon1-85.18<br>AD1-9.82<br>AD6-5 | Good orientation for E > 80 mJ/cm²<br>0/0/0/0/01+/+ |
| 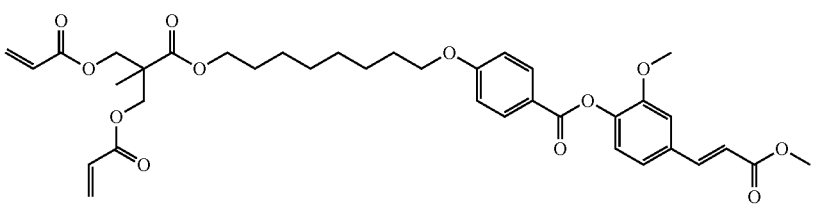<br>Mon2 | Mon2-73.58<br>AD1-26.42 | Good orientation for E > 60 mJ/cm²<br>0/0/0/+/+/++ |
| | Mon2-69.9<br>AD1-25.10<br>AD6-5 | Good orientation for E > 40 mJ/cm²<br>0/0/+/+/+/++ |
| | Mon2-69.9<br>AD1-25.10<br>AD2-5 | Good orientation for E > 20 mJ/cm²<br>0/+/+/+/++/++ |
| | Mon2-84.85<br>AD1-10.15<br>AD2-5 | Good orientation for E > 10 mJ/cm²<br>+/+/++/++/++/++ |

TABLE B-continued

| Structure of monomer | Formulation composition (wgt %) | Curing conditions: Variant 3 |
|---|---|---|
| 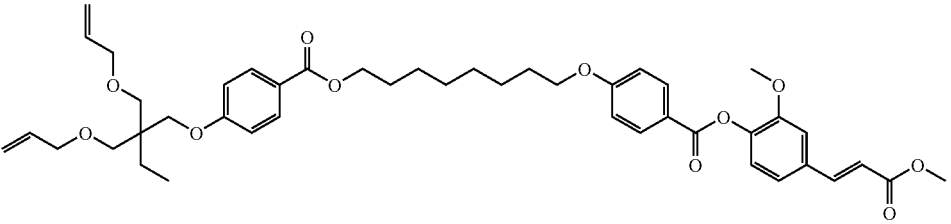 Mon3 | Mon3-72.19 AD1-22.81 AD4-5 | Good orientation for E > 40 mJ/cm² 0/0/+/+/++/++ |
| | Mon3-72.19 AD1-22.81 AD5-5 | Good orientation for E > 100 mJ/cm² 0/0/0/0/0/+ |
| | Mon3-72.19 AD1-22.81 AD6-5 | Good orientation for E > 20 mJ/cm² 0/+/+/++/++/++ |
| | Mon3-72.19 AD1-22.81 AD2-5 | Good orientation for E > 20 mJ/cm² 0/+/+/++/++/++ |
| | Mon3-72.19 AD1-22.81 AD7-5 | Good orientation for E > 60 mJ/cm² 0/0/0/+/+/+ |
| | Mon3-72.19 AD1-22.81 AD8-5 | Good orientation for E > 40 mJ/cm² 0/0/+/+/++/++ |
| | Mon3-82.03 AD1-12.97 AD2-5 | Good orientation for E > 60 mJ/cm² 0/0/0/+/++/++ |
| 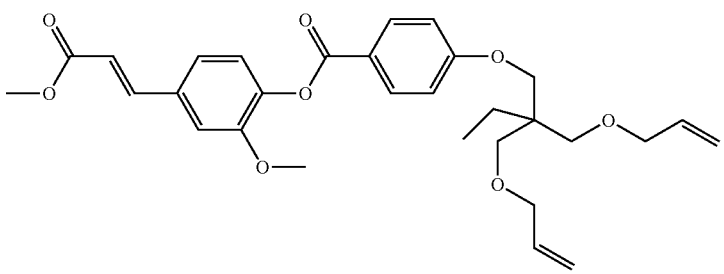 Mon10 | Mon10-64.8 AD1-30.2 AD8-5 | Good orientation for E > 60 mJ/cm² 0/0/0/+/+/++ |
| | Mon10-64.8 AD1-30.2 AD2-5 | Good orientation for E > 80 mJ/cm² 0/0/0/0/+/+ |
| | Mon10-64.8 AD1-30.2 AD4-5 | Good orientation for E > 80 mJ/cm² 0/0/0/0/+/+ |
| | Mon10-64.8 AD1-30.2 AD5-5 | Good orientation for E > 80 mJ/cm² 0/0/0/0/+/+ |
| | Mon10-64.8 AD1-30.2 AD6-5 | Good orientation for E > 60 mJ/cm² 0/0/0/+/+/++ |

The synthesis of Mon3 is described below:

2,2-bis[(allyloxy)methyl]butyn-4-{[(4-methoxybenzoyl)oxy]octyloxy}-2-methoxy-4-[(1E)-3-methoxy-3oxopropan-1-enyl]phenyl 4-methoxybenzoate

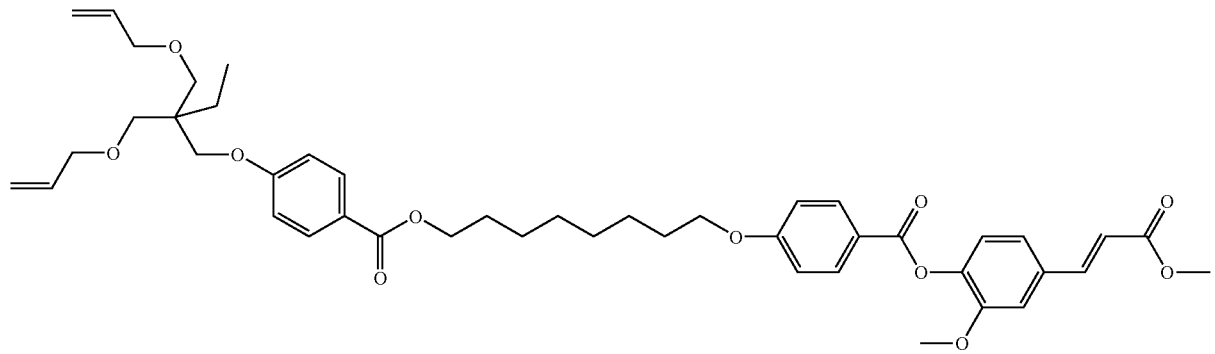 [SMILES: C=CCOCC(CC)(COCC=C)COc1ccc(C(=O)OCCCCCCCCOc2ccc(C(=O)Oc3ccc(/C=C/C(=O)OC)cc3OC)cc2)cc1]

4.88 g (5.61 mmol) of 1-{2,2-bis[(allyoxy)methyl]butoxy}-4-methyl-1-metoxybenzoic acid, 3.00 g (5.61 mmol) of 2-methoxy-4[(1E)-3-methoxy-3oxo-1-propenyl]phenyl-4-[(8-methanesulfonyloctyl)oxy]benzoate and 210 mg (0.56 mmol) of tetrabutylammonium iodide were dissolved in 40 ml N,N-dimethylformamide. 1.02 g (6.73 mmol) of 1,8-diazabicyclo[5.4.0]undec-7-ene (DBU) were added to the solution at room temperature. The resulting suspension was heated to 80° C. After 12 h, the solution was poured on 100 ml water and extracted with ethyl acetate. The organic phase was washed with water, dried over $Na_2SO_4$, filtered and solvent was removed under reduced pressure. The crude material was purified by flash chromatography using 1:3 Ethyl acetate/$CH_2Cl_2$. The final product was evaporated and dried overnight under vacuum.

4.02 g (4.58 mmol) of 2,2-bis[(allyloxy)methyl]butyn-4-{[(4-methoxybenzoyl)oxy]octyloxy}-2-methoxy-4-[(1E)-3-methoxy-3oxopropan-1-enyl]phenyl 4-methoxybenzoate as a colorless oil were obtained (81.6 wgt % yield).

1-{2,2-bis[(allyoxy)methyl]butoxy}-4-methyl-1-methoxybenzoic acid

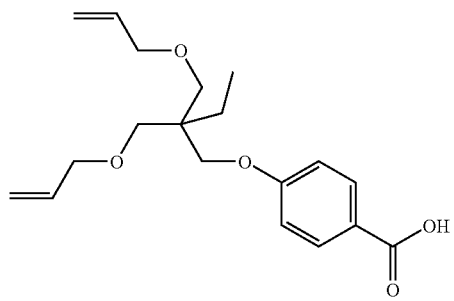 [SMILES: C=CCOCC(CC)(COCC=C)COc1ccc(C(=O)O)cc1]

12.95 g (35.73 mmol) of 1-{2,2-bis[(allyoxy)methyl]butoxy}-4-methyl-1-methoxybenzoate were dissolved in a mixture of 100 ml of water and 50 ml of Ethanol. 5.01 g (89.33 mmol) of potassium hydroxide were added to the solution at room temperature. The reaction was stirred and heated at reflux for 2 h then cooled to room temperature and stirred overnight. After 12 h, the solution was poured on 600 ml water and extracted with Ethyl acetate. The organic phase was washed with water, dried over $Na_2SO_4$, filtered and solvent was removed under reduced pressure. The final product was evaporated and dried for 3 h under vacuum. 11.92 g (35.64 mmol) of 1-{2,2-bis[(allyoxy)methyl]butoxy}-4-methyl-1-metoxybenzoic acid as a colorless oil were obtained (99.7 wgt % yield).

1-{2,2-bis[(allyoxy)methyl]butoxy}-4-methyl-1-methoxybenzoate

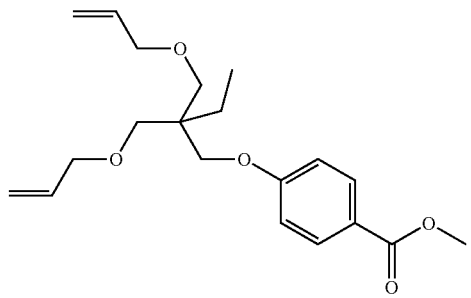 [SMILES: C=CCOCC(CC)(COCC=C)COc1ccc(C(=O)OC)cc1]

10.0 g (41.99 mmol) of trimethylpropane diallyl ether, 6.39 g (41.99 mmol) of 4-Hydroxybenzoic acid methyl ester and 13.22 g (50.39 mmol) of triphenylphosphine were dissolved in 100 ml THF. The solution was cooled to 0° C. and 8.9 ml (46.19 mmol) of Diisopropyl azodicarboxylate were then added drop-wise. The reaction was stirred for 20 h at 68° C. The solution was poured on 100 ml water and extracted with Ethyl acetate. The organic phase was washed with water, dried over $Na_2SO_4$, filtered and solvent was removed under reduced pressure. The crude product was purified by flash chromatography using 1:9 Ethyl acetate/$CH_2Cl_2$.

12.47 g (35.79 mmol) of 1-{2,2-bis[(allyoxy)methyl]butoxy}-4-methyl-1-metoxybenzoate as a colorless oil were obtained (85.2 wgt % yield).

2-methoxy-4[(1E)-3-methoxy-3oxo-1-propenyl]phenyl-4-[(8-methanesulfonyloctyl)oxy]benzoate

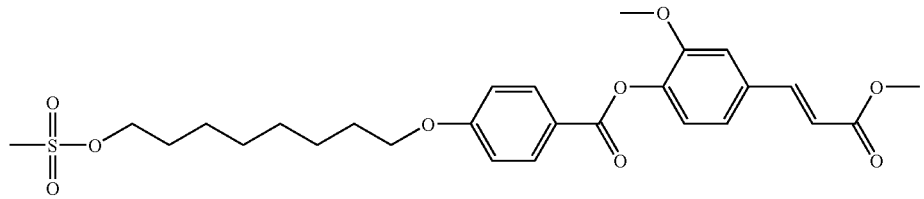

90 g (338 mmol) of 4-[(8-hydroxyoctyl)oxy]benzoic acid were suspended in 800 ml THF with 171 g (1690 mmol) of $NEt_3$. The solution was cooled at −30° C. and 85 g (742 mmol) of Methanesulfonyl chloride were added dropwise at this temperature and stirred for 1 h. 5.5 g (45 mmol) of DMAP and 70 g (338 mmol) of methyl (2E)-3-(4-hydroxy-3-methoxyphenyl)acrylate dissolved in 200 ml THF were added. The solution was stirred for 3 h at 0° C. The mixture was filtrated over celite. The organic phase was extracted with 900 ml Ethyl acetate, washed with 1.6 l water, dried over $Na_2SO_4$ and the solvent was removed under reduced pressure. The crude product was filtrated over $SiO_2$ using 1/1 toluene/Ethyl acetate and concentrated over vacuum. Crystallisation with Ethyl acetate and hexane gave pure product.

53 g of 2-methoxy-4[(1E)-3-methoxy-3oxo-1-propenyl] phenyl-4-[(8-methanesulfonyloctyl)oxy]benzoate as a white crystals were obtained (30 wgt % yield).

4-[(8-hydroxyoctyl)oxy]benzoic acid

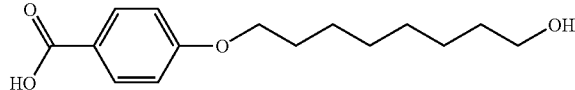

115 g (456 mmol) of methyl 4-[(8-hydroxyoctyl)oxy] benzoate were added to a solution of 64 g (1140 mmol) of KOH in water (1.2 l). The mixture was heated to reflux for 2 h. The reaction was then cooled to 25° C. and 500 ml toluene was added. The reaction was cooled to 15° C. and 130 ml HCl 25% was added. The white suspension was filtered, washed with 800 ml water and dried under vacuum at 60° C. for 24 h.

103 g of 4-[(8-hydroxyoctyl)oxy]benzoic acid as a white solid were obtained (94.5 wgt % yield).

Methyl 4-[(8-hydroxyoctyl)oxy]benzoate

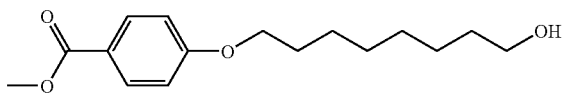

64.1 g (404 mmol) of methyl 4-hydroxybenzoate were dissolved in 440 ml DMF. 112 g (808 mmol) of $K_2CO_3$ were added and the mixture was heated at 60° C. for 30 min. The reaction was cooled to 25° C. and 33.6 g (202 mmol) of KI and 99.8 g (606 mmol) of 8-chlorooctanol were added and the reaction was heated at 62° C. for 18 h. Then, the mixture was cooled to 15° C. and poured on ice (2 l) and stirred for 1 h. The solid was filtered and wash with 800 ml water. The crude product was dissolved in 500 ml Ethyl acetate and washed with 400 ml water. The organic phase was dried over sodium sulfate and concentrated under vacuum. Crystallization with Ethyl acetate and hexane gave pure product 108 g of methyl 4-[(8-hydroxyoctyl)oxy]benzoate as a white solid were obtained (95.3 wgt % yield).

Examples 3

The following examples describe the use of alignment materials according to the present invention for LCD applications, and in particular of VA-type alignment material.

Apart from the current display performance requirements to be fulfilled in modern TV applications, the use of appropriate LPP materials is furthermore also guided by the necessity to achieve specific optical and electro-optical properties, e.g. with respect to the compatibility with the TFT (thin film transistors). Other important characteristics of the materials must also be taken into consideration, i.e. those crucial parameters directly related to and dependent on the molecular properties of the material such as the voltage holding ratio (VHR), the stability of the induced pre-tilt angle against light and heat and the photosensitivity of the alignment layer.

Primarily such characteristics are:

High voltage holding ratio (VHR), i.e. VHR of >90% (measured at 80° C.) In the case of LCDs of thin-film transistor type a certain amount of charge is applied over the course of a very short period of time to the electrodes of a pixel and must not subsequently drain away by means of the resistance of the liquid crystal. The ability to hold that charge and thus to hold the voltage drop over the liquid crystal is quantified by what is known as the "voltage holding ratio" (VHR). It is the ratio of the RMS-voltage (root mean square voltage) at a pixel within one frame period and the initial value of the voltage applied.

High stability of the induced pre-tilt angle against light and heat

Low alignment energy profile (short irradiation time and/or low irradiation energy)

Electrooptical Characterization of the Cell Performances
Flicker Free Method

After the application of an external signal with non-zero DC component, the residual DC voltage can either be measured directly (with a very high impedance voltmeter) or indirectly by compensation with the so-called flicker free method. This method is based on the fact that the optical response of the test cell exhibits temporal fluctuations, i.e. flicker caused by superposition of the internal residual DC voltage and the external driving waveform (usually a symmetric square wave signal).

When an adjustable DC-component is added to the symmetric square wave signal, the fluctuations of light transmitted by the test cell can be eliminated or at least minimized by adequate selection of the external DC component. The external DC-voltage for which the flicker is eliminated or minimized by compensation of the internal residual DC-voltage is taken to be equivalent to the internal residual DC-voltage.

Determination of the Voltage Holding Ratio (VHR)

Two glass plates coated with LPP were irradiated perpendicularly with linearly polarised UV light. From both plates a cell of 5 μm spacing was built such that the illuminated surfaces were facing each other and the previous polarisation directions of illumination were parallel. This cell was then maintained at 120° C. under high vacuum for 14 hours and thereafter filled with TFT liquid crystal mixture MLC6610 from Merck in vacuo at room temperature. Between crossed polarisers a uniformly oriented liquid crystal layer was observed. Prior to testing the voltage holding ratio (VHR) the cell was first subjected to ageing for 50 hours at 120 C. The voltage decay V (at T=20 ms) of a voltage surge of 64 μs with $V_0$ (V at t=0)=0.2V was then measured over a period of T=20 ms. The voltage holding ratio thus determined at room temperature is given by $VHR=V_{rms}(t=T)/V_0$ (%).

Preparation of the Cell and Characterization Thereof

"Thermal Polymerization" Process

Variant 1:

A 3 wgt % solution of Mon13-3 in Cyclopentanone (CP) was prepared. This solution was filtered over a 2 μm Teflon filter and applied onto two indium tin oxide (ITO) coated glass plates by spin coating at 1600 rpm for 60 seconds. The resulting films were baked for 1 h at 180° C. under air atmosphere. All these operations were performed in an environment of reduced ultraviolet light.

Both ITO covered glass plates were irradiated with polarised UV-light at a dose of 48 mJ/cm². The direction of incidence of the light being inclined by 40° relative to the plate normal and the incidence plane was parallel to the short side of the substrate. The two irradiated plates were used to build a cell of 20 μm spacing in an anti-parallel manner such that the irradiated surfaces were facing each other. The cell was then capillary filled with liquid crystal mixture MLC6610 from Merck in the isotropic phase at 95° C. The cell was then gradually cooled down at a rate of 3° C./min from T=95° C. to T=85° C., at a rate of 0.3 C./min from T=85° C. to T=75° C. and at a rate of 5 C./min from T=75° C. to room temperature. When arranged between crossed polarisers, the cell appeared uniformly black for every angle between the short edge of the cell and the polariser transmission axis, as long as viewed from the vertical. In conclusion, the liquid crystal mixture was aligned homeotropically.

When the short edge of the cell was set at 45° to the polariser axis and an AC voltage of 7V and 90 Hz was applied, the liquid crystals switched and caused the cell to appear green (high order birefringence). No defects or tilt domains were observed. Brightness and colour of the switched cell changed asymmetrically when viewed from opposite, but equal oblique angles along a plane parallel to the short edge of the cell. Contrary, no asymmetry was found when viewed obliquely from opposite angles within a plane parallel to the long edge of the cell. When the switched cell with its short edge was aligned parallel or perpendicular to one of the polariser transmission axes the cell appeared dark again. From above observations we concluded that LC alignment capability was induced in the thin film on the substrate due to irradiation with slantwise incident non-polarized light. The azimuthal alignment direction was parallel to the plane of incidence of the non-polarized UV-light.

From tilt angle evaluation by means of the crystal rotation method, a tilt angle value of 89.8° with respect to the substrate surface was obtained.

Variant 2:

The same type of experiment has been done with the same solution, except that the both films were cured under nitrogen atmosphere. From tilt angle evaluation by means of the crystal rotation method a tilt angle value of 88.8° with respect to the substrate surface was obtained.

Variant 3:

The analogous type of experiment has been done with the same solution, except that the both films were irradiated obliquely (with an angle of 40°) under nitrogen with non-polarised UV light for 100 mJ/cm². From tilt angle evaluation by means of the crystal rotation method, a tilt angle value of 88.9° with respect to the substrate surface was obtained.

"Photopolymerization" Process (Variant 4):

A 3 wgt % solution of Mon13-4 in Cyclopentanone (CP) was prepared. This solution was filtered over a 2 μm Teflon filter and applied onto two indium tin oxide (ITO) coated rectangular glass plates by spin coating at 1600 rpm for 60 seconds. The resulting films were dried under vacuum for 20 min and exposed with 500 mJ/cm² to non-polarised UV light under nitrogen. All these operations were performed in an environment of reduced ultraviolet light. Both ITO covered glass plates were irradiated with polarised UV-light at a dose of 250 mJ/cm². Then the experiment followed as described above.

From tilt angle evaluation by means of the crystal rotation method a tilt angle value of 90° with respect to the substrate surface was obtained. The orientation was absolutely homeotropic.

In terms of switching and especially of switching time, it is of advantage to reach a tilt angle which is not exactly 90° to avoid the development of tilt disclination upon switching. The curing conditions described for Variant 2 and Variant 3 ("thermal polymerization"; curing at 180° C. for 60 min under nitrogen) lead to tilt angles around 88.8°, which fulfils this criteria.

As shown in the Table C, high voltage holding ratios were measured for systems based on cyanostilbene and cinnamate moieties, respectively cured with Variant 1 and Variant 4.

These systems offer excellent optical (tunable tilt angle, high stability of the induced pre-tilt angle against heat, good alignment performances) and electro-optical performances (high VHR ratio, etc).

All results are summarized in the following table, including the thermal stability of the tilt angle after a thermal treatment at 130° C. for 1 h.

| | Legend | |
|---|---|---|
| Evaluation | Tilt angle variation (1 h/130° C.) | VHR |
| ++ | <0.2° | >92% |
| + | 0.2-0.5° | 88-92% |
| − | >0.5° | <88% |

TABLE C

| Monomer | Mixture name | Formulation composition (wgt %) | Baking/curing conditions Variant | Tilt angle (°) for exposure energies of 24/48/96/192 mJ/cm² (LPUV-inclination angle = 40°) | Tilt angle variation for exposure energies 24/48/96/192 mJ/cm² (1 h/130° C.) VHR |
|---|---|---|---|---|---|
| 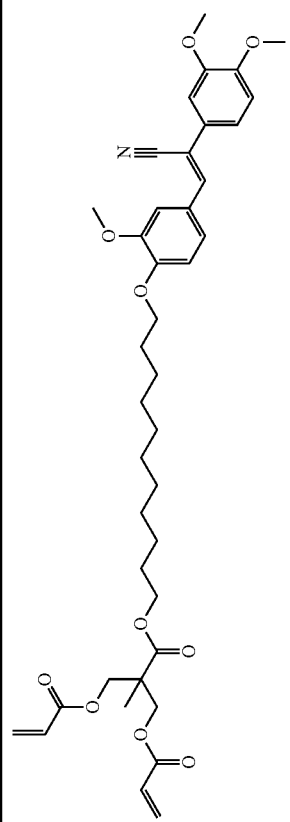<br>Mon1 | Mon1-1 | Mon1-74.29<br>AD1-25.71 | 1 | 0<br>(planar orientation)<br>(well adapted for IPS mode) | ++ |
| 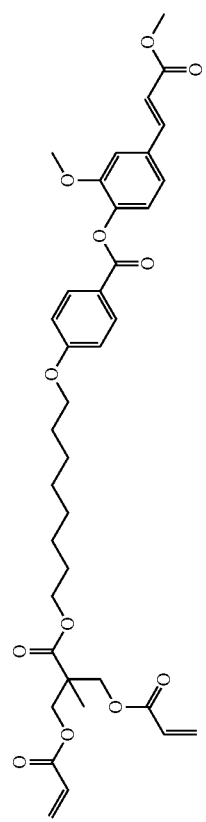<br>Mon2 | Mon2-6 | Mon2-84.85<br>AD1-10.15<br>AD2-5 | 4 | 0<br>(planar orientation)<br>(well adapted for IPS mode) | ++ |

TABLE C-continued

| Monomer | Mixture name | Formulation composition (wgt %) | Baking/curing conditions Variant | Tilt angle (°) for exposure energies of 24/48/96/192 mJ/cm² (LPUV-inclination angle = 40°) | Tilt angle variation for exposure energies 24/48/96/192 mJ/cm² (1 h/130° C.) VHR |
|---|---|---|---|---|---|
| 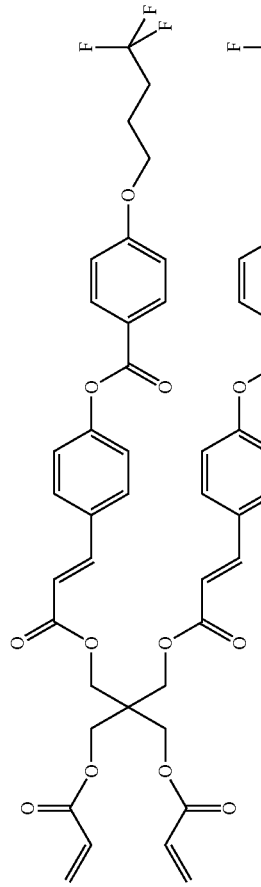 Mon13 | Mon13-1 | Mon13-80.03 AD1-19.97 | 1 | 90 | |
| | Mon13-1 | Mon13-80.03 AD1-19.97 | 2 | 89.3/89.1/88.9/88.9 (well adapted for VA/MVA/PVA modes) | ++/++/++/++ |
| | Mon13-2 | Mon13-92.45 AD1-7.55 | 1 | 90 | |
| | Mon13-2 | Mon13-92.45 AD1-7.55 | 2 | 89.2/88.9/88.7/88.7 (well adapted for VA/MVA/PVA modes) | ++/++/+/+ |
| | Mon13-3 | Mon13-88.75 AD1-7.25 AD3-4 | 1 | 90 | |
| | Mon13-3 | Mon13-88.75 AD1-7.25 AD3-4 | 1 | 90 | |
| | Mon13-3 | Mon13-88.75 AD1-7.25 AD3-4 | 2 | 89/88.8/88.8/88.8 (well adapted for VA/MVA/PVA modes) UV-40° 100/250/500/1000 mJ/cm² | +/+/+/+ |
| | Mon13-3 | Mon13-88.75 AD1-7.25 AD3-4 | 2 | 89/88.7/88.2/87 (well adapted for VA/MVA/PVA modes) | ++/++/+/- |
| | Mon13-4 | Mon13-76.03 AD1-18.97 AD2-5 | 4 | Exposure energies: 250/500/750/1000 90 | |
| | Mon13/5 | Mon13-87.83 AD1-7.17 AD2-5 | 4 | Exposure energies: 250/500/750/1000 90 | |

TABLE C-continued
| Monomer | Mixture name | Formulation composition (wgt %) | Baking/curing conditions Variant | Tilt angle (°) for exposure energies of 24/48/96/192 mJ/cm² (LPUV-inclination angle = 40°) | Tilt angle variation for exposure energies 24/48/96/192 mJ/cm2 (1 h/130° C.) VHR |
|---|---|---|---|---|---|
| 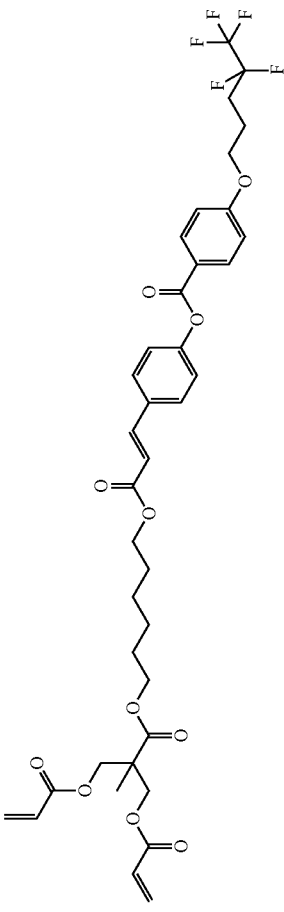 Mon14 | Mon14-1 | Mon14-86.8 AD1-9.2 AD3-4 | 2 | 89.2/89.2/89.2/89.3 (well adapted for VA/MVA/PVA modes) | ++/++/++/++ |

Mon13 was synthesized as follows:

2,2-bis(Acryloyloxy)-3-{[((2E)-3-{4-[(4,4,4-trifluo-robutoxy)benzoyl)oxy]phenyl}prop-2-enoyl)oxyl]}propyl-{[((2E)-3-{4-[(4-(4,4,4-trifluorobu-toxy)benzoyl)oxy]phenyl}acrylate

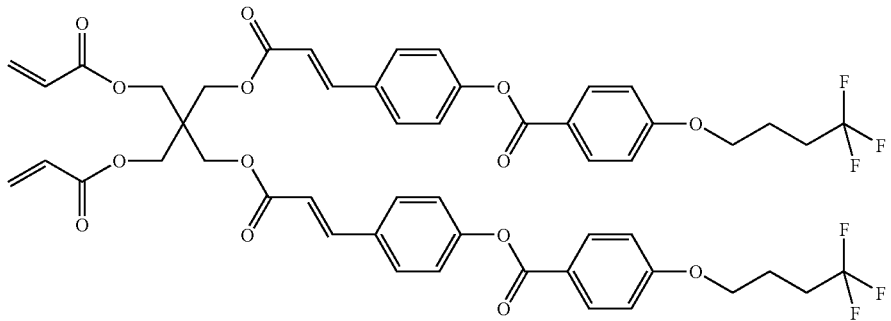 [SMILES: C=CC(=O)OCC(COC(=O)C=C)(COC(=O)/C=C/c1ccc(OC(=O)c2ccc(OCCCC(F)(F)F)cc2)cc1)COC(=O)/C=C/c1ccc(OC(=O)c2ccc(OCCCC(F)(F)F)cc2)cc1]

2.10 g (2.36 mmol) of 2,2-bis(hydroxymethyl)-3-{[((2E)-3-{4-[(4-(4,4,4-trifluorobutoxy)benzoyl)oxy]phenyl}prop-2-enoyl)oxy]}propyl-{[((2E)-3-{4-[(4-(4,4,4-trifluorobu-toxy)benzoyl)oxy]phenyl}acrylate were dissolved with BHT (two grains) in THF (20 mL). 598 mg (5.91 mmol) of triethylamine were added. The mixture was cooled to 0° C. and 513 mg (5.67 mmol) of acryloyl chloride were added dropwise and than, 60 mg (0.47 mmol) of DMAP. After two hours, the reaction was quenched with water, the organic phase was extracted with Ethyl acetate, dried over sodium sulfate and concentrated under vacuum. Crystallization with Ethyl acetate and hexane gave 750 mg of 2,2-bis(Acryloy-loxy)-3-{[((2E)-3-{4-[(4-(4,4,4-trifluorobutoxy)benzoyl)oxy]phenyl}prop-2- enoyl)oxy]}propyl-{[((2E)-3-{4-[(4-(4,4,4-trifluorobutoxy)benzoyl)oxy]phenyl}acrylate as a white solid (32 wgt % yield).

2,2-bis(hydroxymethyl)-3-{[((2E)-3-{4-[(4-(4,4,4-trifluorobutoxy)benzoyl)oxy]phenyl}prop-2-enoyl)oxy]}propyl-{[((2E)-3-{4- [(4-4,4,4-trifluorobutoxy)benzoyl)oxy]phenyl}acrylate

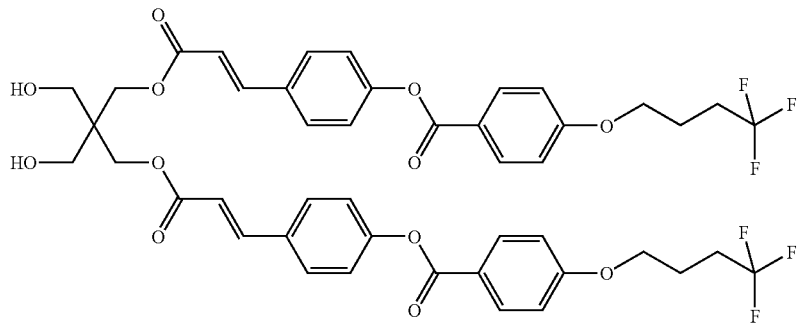 [SMILES: O=C(/C=C/c1ccc(OC(=O)c2ccc(OCCCC(F)(F)F)cc2)cc1)OCC(CO)(CO)COC(=O)/C=C/c1ccc(OC(=O)c2ccc(OCCCC(F)(F)F)cc2)cc1]

2.44 g (2.30 mmol) of 2,2-bis[(tetrahydro-2H-pyran-2yloxy)methyl]-3-{[((2E)-3-{4-[(4-(4,4,4-trifluorobutoxy)benzoyl)oxy]phenyl}prop- 2-enoyl)oxy]}propyl-{[((2E)-3-{4-[(4-(4,4,4-trifluorobutoxy)benzoyl)oxy]phenyl}acrylate were dissolved in THF (20 mL) and EtOH (20 mL) at RT. To this solution was added 70 mg (0.36 mmol) of pTsOH and the mixture was stirred overnight at RT. The reaction was quenched with NaHCO₃sat (30 mL) and diluted with ethyl acetate (60 mL). The organic phase was washed with water (30 mL), dried over sodium sulfate, and concentrated under vacuum. Crystallization with Ethyl acetate/hexane gave 1.55 g of 2,2-bis(hydroxymethyl)-3-{[((2E)-3-{4-[(4-(4,4,4-trifluorobutoxy)benzoyl)oxy]phenyl}prop-2-enoyl)oxy]}propyl-{[(2E)-3-   {4-[(4-(4,4,4-trifluorobutoxy)benzoyl)oxy]phenyl}acrylate as a white solid (75 wgt % yield).

2,2-bis[(tetrahydro-2H-pyran-2yloxy)methyl]-3-{[((2E)-3-{4-[(4-(4,4,4-trifluorobutoxy)benzoyl)oxy]phenyl}prop-2-enoyl)oxy]}propyl-{[((2E)-3-{4-[(4-(4,4,4-trifluorobutoxy)benzoyl)oxy]phenyl}acrylate

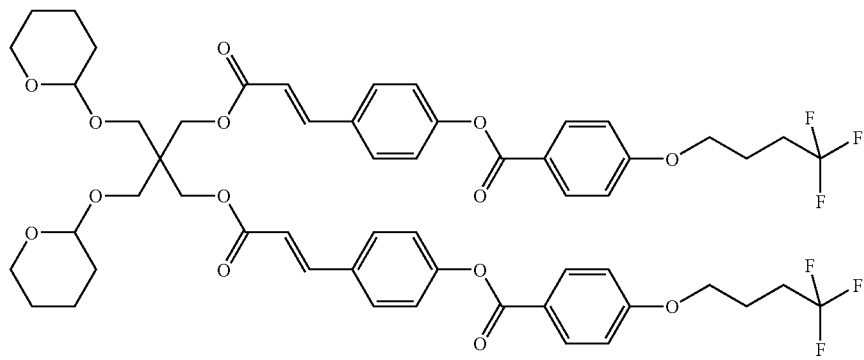 [SMILES: O=C(/C=C/c1ccc(OC(=O)c2ccc(OCCCC(F)(F)F)cc2)cc1)OCC(COC(=O)/C=C/c1ccc(OC(=O)c2ccc(OCCCC(F)(F)F)cc2)cc1)(COC1CCCCO1)COC1CCCCO1]

3.53 g of (2E)-3-(4-{[4-(4,4,4-trifluorobutoxy)benzoyl]oxy}phenyl)acrylic acid (8.96 mmol) were dissolved in Toluene (20 mL). Two drops of DMF were added to the heterogeneous solution. The mixture was heated to 90° C. until 1.16 g (9.82 mmol) of thionyl chloride were added dropwise. A clear solution was observed after a few minutes and the mixture was heated 1 hour at this temperature. The excess of SOCl₂ was distillated and the solution was cooled to 40° C. A mixture of 1.3 g (4.27 mmol) of 2,2-bis[(tetrahydro-2H-pyran-2yloxy)methyl]propane-1,3-diol, 1.18 g (14.9 mmol) of pyridine and 200 mg (1.7 mmol) of DMAP in THF (20 mL) was added dropwise to the acyl chloride solution and the temperature was increased to 60° C. and stirred overnight. The reaction was quenched with HCl 1M (5 mL) and diluted with ethyl acetate (60 mL). The organic phase was washed with water (30 mL), dried over sodium sulfate, and concentrated under vacuum. Chromatography column Ethyl acetate/cyclohexane 1/1 as eluent, gave 2.50 g of 2,2-bis[(tetrahydro-2H-pyran-2yloxy)methyl]-3-{[((2E)-3-{4-[(4-(4,4,4- trifluorobutoxy)benzoyl)oxy]phenyl}prop-2-enoyl)oxy]}propyl-{[((2E)-3-{4-[(4-(4,4,4-trifluorobutoxy)benzoyl)oxy]phenyl}acrylate (colorless oil) (55 wgt % yield).

(2E)-3-(4-{[4-(4,4,4-trifluorobutoxy)benzoyl]oxy}phenyl)acrylic acid

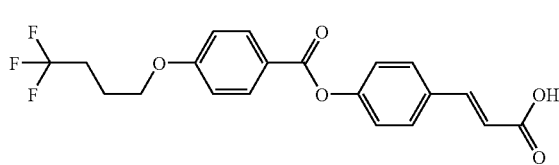 [SMILES: O=C(O)/C=C/c1ccc(OC(=O)c2ccc(OCCCC(F)(F)F)cc2)cc1]

5.00 g (14.2 mmol) of 4-formylphenyl 4-(4,4,4-trifluorobutoxy)benzoate and 3.00 g (28.4 mmol) of malonic acid were dissolved in 18 ml (227.1 mmol) of pyridine. 1.21 g (14.2 mmol) of piperidine were added to the suspension which was allowed to react at 100° C. under argon for 1.5 h. The yellow solution was then thrown on ice. The solution was carefully acidified to pH=1-2 with a 25% HCl solution and was stirred for 15 min. The product was filtrated off and dried at room temperature under vacuum for 10 h to give 5.2 g of (2E)-3-(4-{[4-(4,4,4-trifluorobutoxy)benzoyl]oxy}phenyl)acrylic acid as a white powder.

4-Formylphenyl-4-(4,4,4-trifluorobutoxy)benzoate

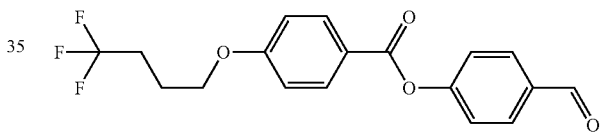

6.89 g (56.4 mmol) of 4-hydroxybenzaldehyd, 14.0 g (56.4 mmol) of 4-(4,4,4-trifluorobutoxy)benzoic acid, 0.69 g (5.6 mmol) of 4-Dimethylaminopyridine were dissolved in 100 ml of dichloromethane. 11.89 g (62.0 mmol) of N-(3-Dimethylaminopropyl)-N'-ethylcarbodiimide hydrochloride (EDC hydrochloride) are added at 0° C. The solution was stirred for 1 h at 0° C. and allowed to stir at room temperature overnight. After 22 hours at room temperature the reaction mixture was partitioned between dichloromethane and water; the organic phase was washed repeatedly with water, dried over sodium sulfate, filtered and concentrated by rotary evaporation. Crystallization form 2-propanol at 0° C. gave 17.1 g of 4-formylphenyl-4-(4,4,4-trifluorobutoxy)benzoate as colorless crystals.

4-(4,4,4-trifluorobutoxy)benzoic acid

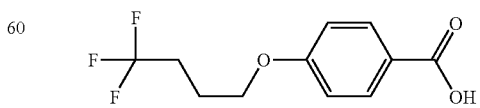

55.00 g (0.408 mol) of 4,4,4-trifluorobutan-1-ol were dissolved in 550 ml tetrahydrofurane, 142 ml (0.102 mol) of triethylamine were added at room temperature. 38 ml (0.490 mol) of methanesulfonyle chloride were added dropwise under nitrogen. The mixture was stirred for 1 h at 0-5° C. The beige suspension was Hyflo-filtrated and washed with tetrahydrofuran. The filtrate was concentrated. The residue was dissolved in 1.4 L of 1-methyl-2-pyrrolidone and 62.70 g (0.408 mol) of methyl 4-hydroxybenzoate and 226.00 g (1.43 mol) of potassium carbonate were added to the lightly brown solution. The reaction suspension was allowed to react at 80° C. for 14 h. 1 L (1.0 mol) of a 1N NaOH solution was added to the above mixture. The suspension was heated at reflux temperature for 30 min until the reaction was completed. The reaction mixture was allowed to cool at room temperature and thrown in cold water. The solution was carefully acidified with a 25% HCl solution and was stirred for 15 min. The product was filtrated off, washed with water and dried overnight at room temperature under vacuum to give 99.00 g of 4-(4,4,4-trifluorobutoxy)benzoic acid as a white solid (98 wgt % yield).

2,2-bis[(tetrahydro-2H-pyran-2yloxy)methyl]propane-1,3-diol

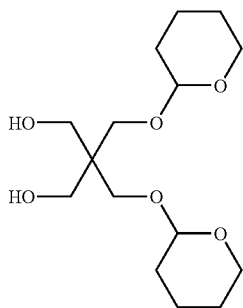 [SMILES: OCC(CO)(COC1CCCCO1)COC1CCCCO1]

3.00 g (7.72 mmol) of diethyl bis[(tetrahydro-2H-pyran-2yloxy)methyl]malonate were dissolved in THF (40 mL) and cooled to 0° C. 1.93 mL (3.86 mmol) of LiAlH$_4$ 2M in THF was added dropwise. The reaction was stirred for 2 h than 2 mL of LiAlH$_4$ were added to completed the reaction. The mixture was quenched with Ethyl acetate than EtOH and finally by slow addition of water. The organic phase was extracted with Ethyl acetate and washed with a saturated solution of potassium and sodium tartrate, dried over sodium sulfate, and concentrated under vacuum. Chromatography column Ethyl acetate/cyclohexane 6/4 to 100% as eluent, gave compound 2.50 g of 2,2-bis[(tetrahydro-2H-pyran-2yloxy)methyl]propane-1,3-diol as a colorless oil (58 wgt % yield).

Diethyl bis[(tetrahydro-2H-pyran-2yloxy)methyl]malonate

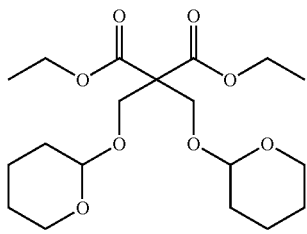 [SMILES: CCOC(=O)C(COC1CCCCO1)(COC1CCCCO1)C(=O)OCC]

10.0 g (45.4 mmol) of diethyl bis(hydroxymethyl)malonate and 430 mg (2.27 mmol) of pTsOH were dissolved in CH$_2$Cl$_2$ and the mixture was cooled to 0° C. 8.02 g (95.3 mmol) of 3,4-dihydro-2H-pyran were added dropwise and the reaction was stirred for 3 h at this temperature. The reaction was quenched with NaHCO$_3$ sat. The organic phase was extracted with CH$_2$Cl$_2$, washed, dried over sodium sulfate and concentrated under vacuum. Chromatography column Ethyl acetate/cyclohexane 1/9 as eluent gave 13.0 g of diethyl bis[(tetrahydro-2H-pyran-2yloxy)methyl]malonate as a colorless oil (75 wgt % yield).

The invention claimed is:
1. Structured or unstructured anisotropic photoalignment material obtainable by a process comprising
   a) applying a composition (VI) for preparation of photoalignment materials comprising thioether units; and then
   b) optionally drying,
   thereby providing an applied composition (VII), and then
   c) polymerizing applied composition (VII) obtained after step a) or step b), and
   then irradiating the applied composition (VII) obtained after step c) with aligning light to induce anisotropy, or
   d) simultaneously polymerizing and irradiating the applied composition (VII), obtained after step a) or step b), with aligning light to induce anisotropy;
   wherein the composition (VI) comprises:
   a) at least one photoreactive compound for photoalignment materials comprising thioether units;
   b) at least one polythiol, wherein the at least one polythiol is selected from the group consisting of polymeric polythiols, aliphatic dithiols, aromatic dithiols, oligomeric dithiols, tetrafunctional thiols, multifunctional thiols having functionality greater than 4, trimethylolpropane tris-mercaptoacetate glycerol tri(11-mercaptoundecanoate) and trimethylol propane tri(11-mercaptoundecate),
   c) optionally at least one reactive and/or non-reactive additive(s), and
   d) optionally at least one initiator(s), and
   e) optionally at least one solvent(s),
   wherein a molar ratio of thiol groups of the polythiol to unsaturated carbon-carbon bonds in the photoalignment material is in a range from about 0.1-1.5,
   wherein the at least one photoreactive compound is:

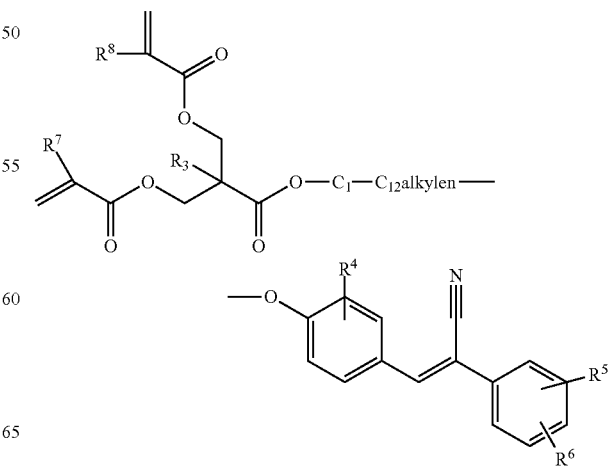

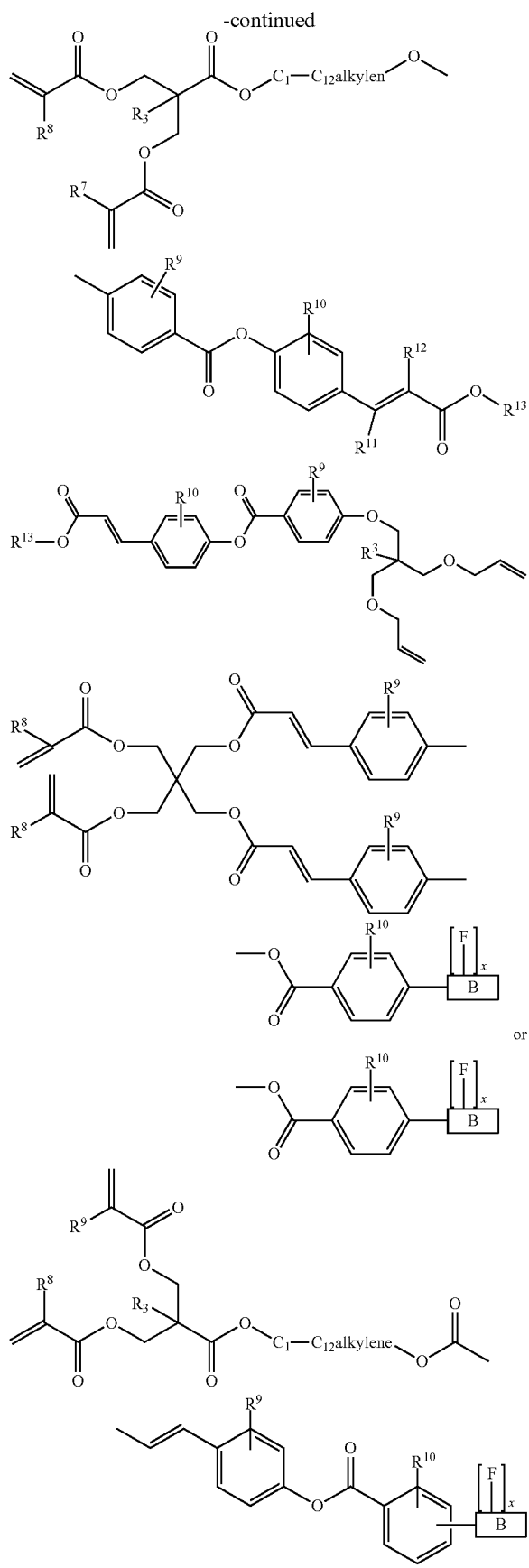

wherein
R³, R⁴, R⁵, R⁶, R⁷, R⁸, R⁹, R¹⁰, R¹¹, R¹²‧R¹³, R¹⁴ are independently from each other hydrogen or substituted or unsubstituted $C_1$-$C_6$alkyl, $C_1$-$C_6$alkoxy, halogen, or cyano, wherein the compound residue (Ia)

(Ia)

represents a straight-chain or branched $C_1$-$C_{16}$ fluoralkyl group, wherein
F is fluorine, and
x is an integer from 0 to 15;
B represents a straight-chain or branched $C_1$-$C_{16}$ alkyl group, which is in addition to its fluorine substituent(s) unsubstituted or substituted by di-($C_1$-$C_{16}$alkyl) amino, $C_1$-$C_6$alkoxy, nitro, cyano and/or chlorine; and wherein one or more —CH₂— group may independently from each other be replaced by a linking group.

2. A method of using the structured or unstructured photoalignment material as claimed in claim 1, comprising preparing an unpatterned or patterned optical or electro-optical component and system, multilayer system, or device with the photoalignment material, wherein the photoalignment material is prepared by a process comprising
a) applying the composition (VI) of claim 1, and then
b) optionally drying, and then
c) polymerizing the applied composition (VII) of claim 1 obtained after step a) or step b), and
then irradiating the applied composition (VII) obtained after step c) with aligning light to induce anisotropy, or
d) simultaneously polymerizing and irradiating the applied composition (VII), obtained after step a) or step b), with aligning light to induce anisotropy.

3. Unpatterned or patterned optical or electro-optical element, system and device comprising structured or unstructured photoalignment material as claimed in claim 1 and as prepared by a process comprising
a) applying the composition (VI) of claim 1, and then
b) optionally drying, and then
c) polymerizing the applied composition (VII) of claim 1 obtained after step a) or step b), and
then irradiating the applied composition (VII) obtained after step c) with aligning light to induce anisotropy, or
d) simultaneously polymerizing and irradiating the applied composition (VII), obtained after step a) or step b), with aligning light to induce anisotropy.

4. A method of using an unpatterned or patterned optical or electro-optical element as claimed in claim 3, comprising preparing a display waveguide, a security or brand protection element, a bar code, an optical grating, a filter, a retarder, a compensation film, a reflectively polarizing film, an absorptive polarizing film, an anisotropically scattering film compensator and retardation film, a twisted retarder film, a cholesteric liquid crystal film, a guest-host liquid crystal film, a monomer corrugated film, a smectic liquid crystal film, a polarizer, a piezoelectric cell, a thin film exhibiting non-linear optical properties, a decorative optical element, a brightness enhancement film, a component for wavelength-band-selective compensation, a component for multi-domain compensation, a component of multiview liquid crystal displays, an achromatic retarder, a polarization state correction / adjustment film, a component of optical or electro-optical sensors, a component of brightness enhancement film, a component for light-based telecommunication devices, a G/H-polarizer with an anisotropic absorber, a reflective circular polarizer, a reflective linear polarizer, a MC (monomer corrugated film), twisted nematic (TN) liquid crystal displays, hybrid aligned nematic (HAN) liquid crystal displays, electrically controlled birefringence (ECB) liquid crystal displays, supertwisted nematic (STN) liquid crystal displays, optically compensated birefringence (OCB) liquid crystal displays, pi-cell liquid crystal displays, in-plane switching (IPS) liquid crystal displays, fringe field switching (FFS) liquid crystal displays, vertically aligned (VA) liquid crystal displays with the unpatterned or patterned optical or electro-optical element; wherein all of the displays are applied in either transmissive or reflective or transflective mode.

5. A method of using the structured or unstructured photoalignment material as claimed in claim 1, comprising providing the photoalignment material as an structured or unstructured photoalignment layer for aligning organic or inorganic compounds, wherein the photoalignment material is prepared by a process comprising
a) applying the composition (VI) of claim 1, and then
b) optionally drying, and then
c) polymerizing the applied composition (VII) of claim 1 obtained after step a) or step b), and
then irradiating the applied composition (VII) obtained after step c) with aligning light to induce anisotropy, or
d) simultaneously polymerizing and irradiating the applied composition (VII), obtained after step a) or step b), with aligning light to induce anisotropy.

6. Structured or unstructured anisotropic photoalignment material as claimed in claim 1, wherein the at least one polythiol is pentaerythritol tetrakis(3-mercaptopropionate).

7. Structured or unstructured anisotropic photoalignment material as claimed in claim 1, wherein $R^3$, $R^4$, $R^5$, $R^6$, $R^7$, $R^8$, $R^9$, $R^{10}$, $R^{11}$, $R^{12}$, $R^{13}$, $R^{14}$ are independently from each other hydrogen or substituted or unsubstituted ethyl or methyl, ethoxy or methoxy, halogen, or cyano.

8. Structured or unstructured anisotropic photoalignment material comprising
(A) at least one photoreactive compound for preparation of photoalignment materials comprising thioether units; and
(B) at least one polythiol, wherein the at least one polythiol is selected from the group consisting of polymeric polythiols, aliphatic dithiols, aromatic dithiols, oligomeric dithiols, tetrafunctional thiols, multifunctional thiols having functionality greater than 4, trimethylolpropane tris-mercaptoacetate glycerol tri (11-mercaptoundecanoate) and trimethylol propane tri (11-mercaptoundecate),
wherein a molar ratio of thiol groups of the polythiol to unsaturated carbon-carbon bonds in the photoalignment material is in a range from about 0.1-1.5,
wherein the at least one photoreactive compound is:

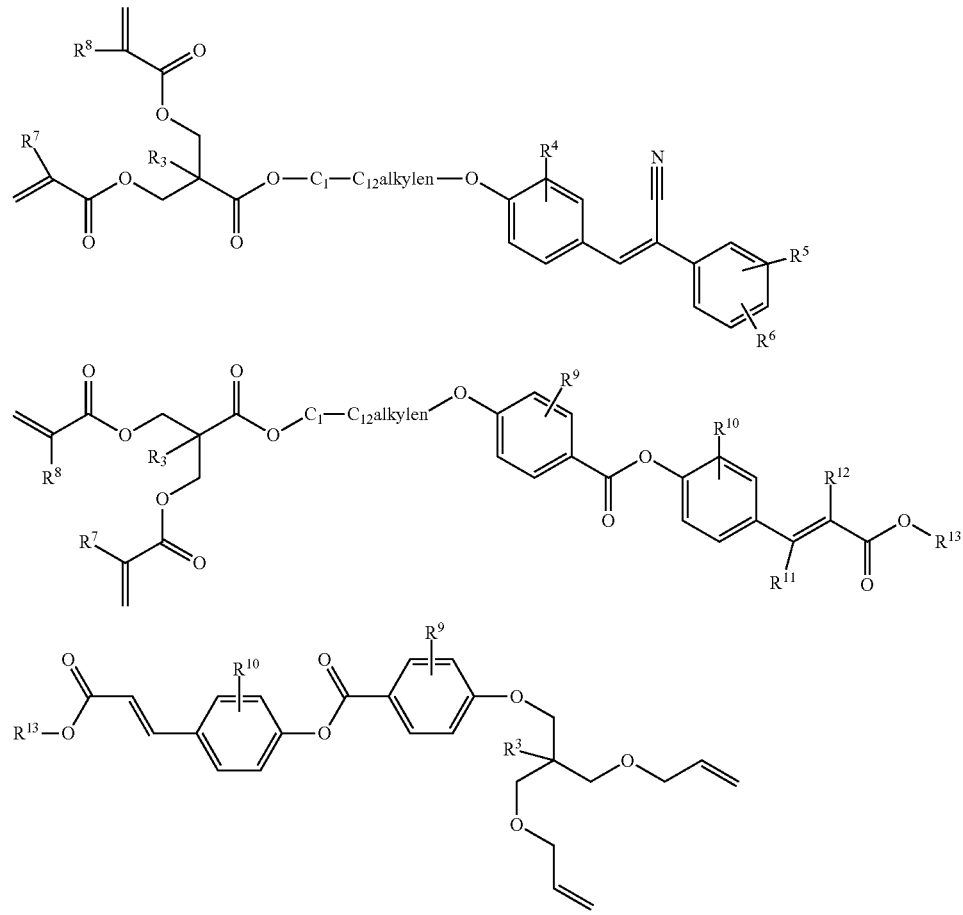

-continued

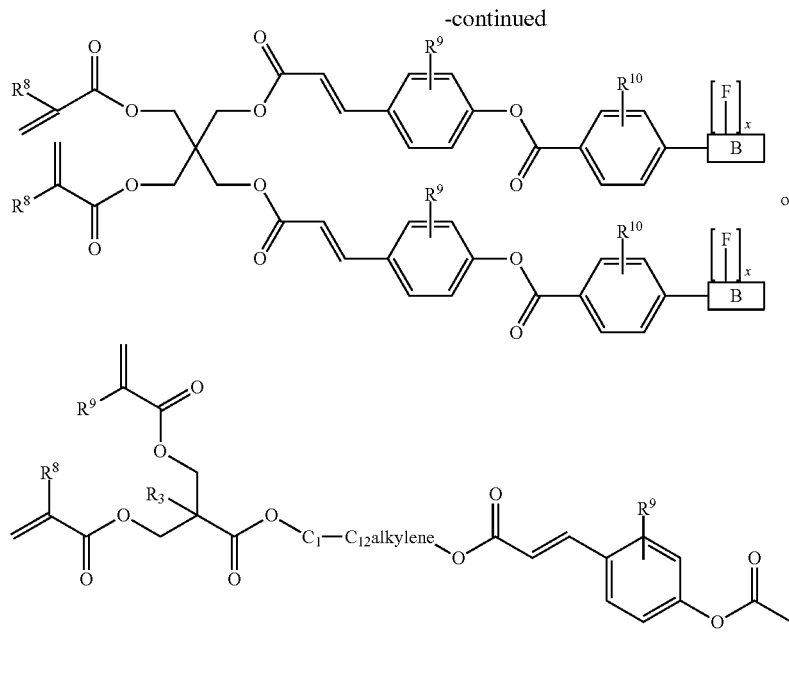

wherein
$R^3, R^4, R^5, R^6, R^7, R^8, R^9, R^{10}, R^{11}, R^{12}, R^{13}, R^{14}$ are independently from each other hydrogen or substituted or unsubstituted $C_1$-$C_6$alkyl, $C_1$-$C_6$alkoxy, halogen, or cyano, wherein the compound residue (Ia)

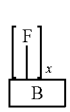
(Ia)

represents a straight-chain or branched $C_1$-$C_{16}$fluoralkyl group, wherein
F is fluorine, and
x is an integer from 0 to 15;
B represents a straight-chain or branched $C_1$-$C_{16}$ alkyl group, which is in addition to its fluorine substituent(s) unsubstituted or substituted by di-($C_1$-$C_{16}$alkyl)amino, $C_1$-$C_6$alkoxy, nitro, cyano and/or chlorine; and wherein one or more —$CH_2$— group may independently from each other be replaced by a linking group.

9. A method of using the structured or unstructured photoalignment material as claimed in claim 8, comprising preparing an unpatterned or patterned optical or electro-optical component and system, multilayer system, device with the photoalignment material, or providing the photoalignment material as an structured or unstructured photoalignment layer for aligning organic or inorganic compounds, wherein the photoalignment material is prepared by a process comprising
 a) applying a composition (VI), and then
 b) optionally drying, thereby providing an applied composition (VII), and then
 c) polymerizing the applied composition (VII) obtained after step a) or step b), and
 then irradiating the applied composition (VII) obtained after step c) with aligning light to induce anisotropy, or
 d) simultaneously polymerizing and irradiating the applied composition (VII), obtained after step a) or step b), with aligning light to induce anisotropy,
wherein the composition (VI) comprises
 a) the at least one photoreactive compound of claim 8 for photoalignment materials comprising thioether units; and
 b) the at least one polythiol of claim 8,
 c) optionally at least one reactive and/or non-reactive additive(s), and
 d) optionally at least one initiator(s), and
 e) optionally at least one solvent(s).

10. Unpatterned or patterned optical or electro-optical element, system and device comprising structured or unstructured photoalignment material as claimed in claim 8 and as prepared by a process comprising
 a) applying a composition (VI), and then
 b) optionally drying, thereby providing an applied composition (VII), and then
 c) polymerizing the applied composition (VII) obtained after step a) or step b), and
 then irradiating the applied composition (VII) obtained after step c) with aligning light to induce anisotropy, or
 d) simultaneously polymerizing and irradiating the applied composition (VII), obtained after step a) or step b), with aligning light to induce anisotropy,
wherein the composition (VI) comprises
 a) the at least one photoreactive compound of claim 8, and
 b) the at least one polythiol of claim 8,
 c) optionally at least one reactive and/or non-reactive additive(s), and
 d) optionally at least one initiator(s), and
 e) optionally at least one solvent(s).

11. Structured or unstructured photoalignment material according to claim 8, wherein the photoalignment material is a structured photoalignment material.

12. Structured or unstructured anisotropic photoalignment material according to claim 8, wherein the photoreactive compound is

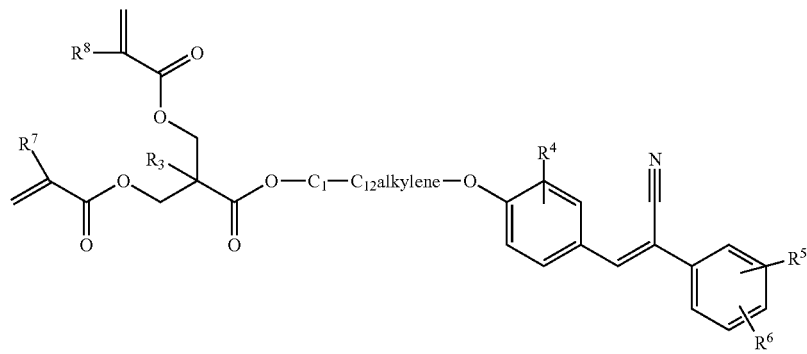

13. Structured or unstructured anisotropic photoalignment material according to claim 8, wherein the molar ratio of thiol groups of the polythiol to unsaturated carbon-carbon bonds in the photoalignment material is in a range from more than 1 to less than or equal to 1.5.

14. Structured or unstructured anisotropic photoalignment material as claimed in claim 8, $R^3$, $R^4$, $R^5$, $R^6$, $R^7$, $R^8$, $R^9$, $R^{10}$, $R^{11}$, $R^{12}$, $R^{13}$, $R^{14}$ are independently from each other hydrogen or substituted or unsubstituted ethyl or methyl, ethoxy or methoxy, halogen, or cyano.

15. Structured or unstructured photoalignment material comprising a composition (VI) for preparation of anisotropic photoalignment materials comprising thioether units, the composition (VI) comprising:

a) at least one photoreactive compound for photoalignment materials comprising thioether units;
b) at least one polythiol, wherein the at least one polythiol is selected from the group consisting of polymeric polythiols, aliphatic dithiols, aromatic dithiols, oligomeric dithiols, tetrafunctional thiols, multifunctional thiols having functionality greater than 4, trimethylolpropane tris-mercaptoacetate glycerol tri(11-mercaptoundecanoate) and trimethylol propane tri(11-mercaptoundecate),
c) optionally at least one reactive and/or non-reactive additive(s), and
d) optionally at least one initiator(s), and
e) optionally at least one solvent(s),
wherein a molar ratio of thiol groups of the polythiol to unsaturated carbon-carbon bonds in the photoalignment material is in a range from about 0.1-1.5,
wherein the at least one photoreactive compound is:

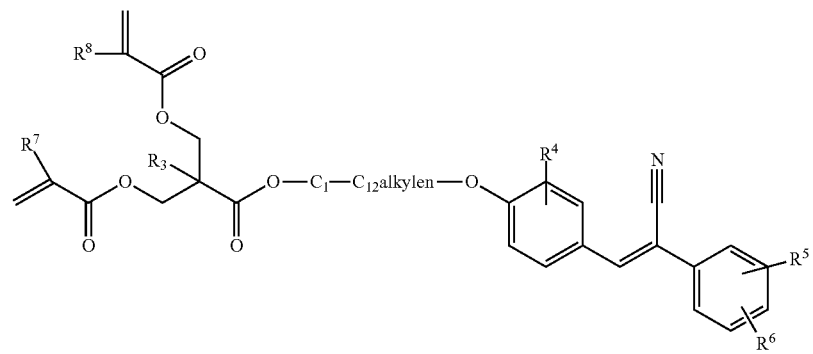

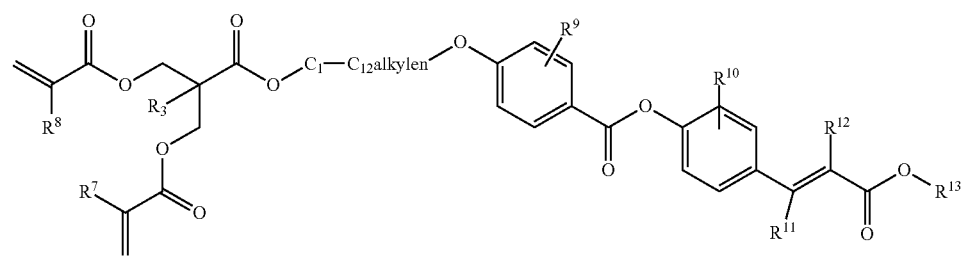

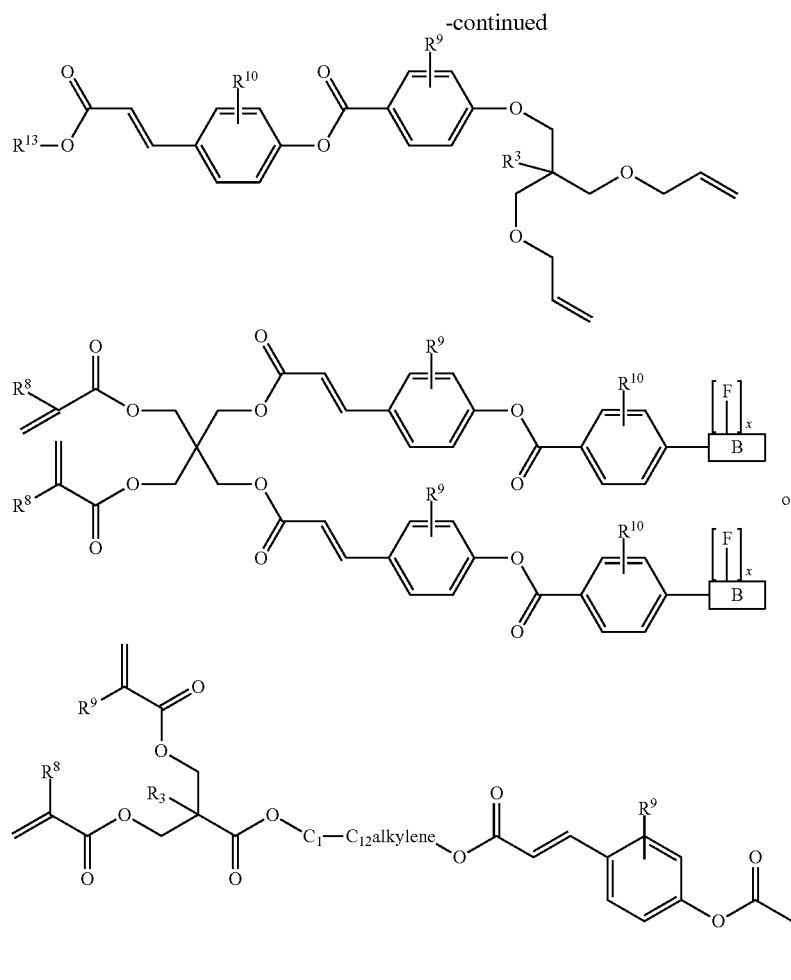

wherein
R³, R⁴, R⁵, R⁶, R⁷, R⁸, R⁹, R¹⁰, R¹¹, R¹², R¹³, R¹⁴ are independently from each other hydrogen or substituted or unsubstituted $C_1$-$C_6$alkyl, $C_1$-$C_6$alkoxy, halogen, or cyano, wherein the compound residue (Ia)

(Ia)

represents a straight-chain or branched $C_1$-$C_{16}$fluoralkyl group, wherein
F is fluorine, and
x is an integer from 0 to 15;
B represents a straight-chain or branched $C_1$-$C_{16}$ alkyl group, which is in addition to its fluorine substituent(s) unsubstituted or substituted by di-($C_1$-$C_{16}$alkyl)amino, $C_1$-$C_6$alkoxy, nitro, cyano and/or chlorine; and wherein one or more —CH₂— group may independently from each other be replaced by a linking group.

16. A method of using the structured or unstructured photoalignment material as claimed in claim 15, comprising preparing an unpatterned or patterned optical or electro-optical component and system, multilayer system, device with the photoalignment material, or providing the photoalignment material as an structured or unstructured photoalignment layer for aligning organic or inorganic compounds, wherein the photoalignment material is prepared by a process comprising
   a) applying the composition (VI) of claim 15, and then
   b) optionally drying, thereby providing an applied composition (VII), and then
   c) polymerizing the applied composition (VII) obtained after step a) or step b), and
   then irradiating the applied composition (VII) obtained after step c) with aligning light to induce anisotropy, or
   d) simultaneously polymerizing and irradiating the applied composition (VII), obtained after step a) or step b), with aligning light to induce anisotropy.

17. Unpatterned or patterned optical or electro-optical element, system and device comprising structured or unstructured photoalignment material as claimed in claim 15 and as prepared by a process comprising
   a) applying the composition (VI) of claim 15, and then
   b) optionally drying, thereby providing an applied composition (VII), and then
   c) polymerizing the applied composition (VII) obtained after step a) or step b), and
   then irradiating the applied composition (VII) obtained after step c) with aligning light to induce anisotropy, or d) simultaneously polymerizing and irradiating the applied composition (VII), obtained after step a) or step b), with aligning light to induce anisotropy.

18. Structured or unstructured photoalignment material as claimed in claim 15 wherein $R^3$, $R^4$, $R^5$, $R^6$, $R^7$, $R^8$, $R^9$, $R^{10}$, $R^{11}$, $R^{12}$, $R^{13}$, $R^{14}$ are independently from each other hydrogen or substituted or unsubstituted ethyl or methyl, ethoxy or methoxy, halogen, or cyano.

* * * * *